United States Patent
Wang et al.

(10) Patent No.: US 11,308,579 B2
(45) Date of Patent: Apr. 19, 2022

(54) IMAGE STITCHING METHOD, IMAGE STITCHING APPARATUS, DISPLAY APPARATUS, AND COMPUTER PRODUCT

(71) Applicant: BOE Technology Group Co., Ltd., Beijing (CN)

(72) Inventors: Pengpeng Wang, Beijing (CN); Haisheng Wang, Beijing (CN); Xiaoliang Ding, Beijing (CN); Chihjen Cheng, Beijing (CN); Yanling Han, Beijing (CN); Ping Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 416 days.

(21) Appl. No.: 16/345,975

(22) PCT Filed: Jun. 19, 2018

(86) PCT No.: PCT/CN2018/091810
§ 371 (c)(1),
(2) Date: Apr. 29, 2019

(87) PCT Pub. No.: WO2019/174146
PCT Pub. Date: Sep. 19, 2019

(65) Prior Publication Data
US 2021/0327024 A1    Oct. 21, 2021

(30) Foreign Application Priority Data
Mar. 13, 2018   (CN) .......................... 201810206982.8

(51) Int. Cl.
*G06K 9/00*   (2006.01)
*G06T 3/40*   (2006.01)
(Continued)

(52) U.S. Cl.
CPC ............ *G06T 3/4038* (2013.01); *G06T 7/593* (2017.01); *G06T 7/85* (2017.01); *H04N 13/239* (2018.05);
(Continued)

(58) Field of Classification Search
CPC ......... G06T 3/4038; G06T 7/85; G06T 7/593; G06T 2207/20076; H04N 13/246; H04N 13/239; H04N 2013/0081
See application file for complete search history.

(56) References Cited

U.S. PATENT DOCUMENTS

| | | | |
|---|---|---|---|
| 6,023,588 A * | 2/2000 | Ray | H04N 13/239 396/20 |
| 6,791,598 B1 * | 9/2004 | Luken | H04N 13/261 348/36 |

(Continued)

FOREIGN PATENT DOCUMENTS

| | | |
|---|---|---|
| CN | 104519340 A | 4/2015 |
| CN | 104715469 A | 6/2015 |

(Continued)

OTHER PUBLICATIONS

Second Office Action in the Chinese Patent Application No. 201810206982.8, dated Mar. 19, 2020; English translation attached.
(Continued)

*Primary Examiner* — Shervin K Nakhjavan
(74) *Attorney, Agent, or Firm* — Intellectual Valley Law, P.C.

(57) ABSTRACT

The present application provides an image stitching method. The image stitching method includes acquiring a first depth image a present frame of image obtained by a first camera; acquiring a second depth image of the present frame of image obtained by a second camera, the second depth image and the first depth image parlay overlapping with each other;
(Continued)

converting the first depth image in a first camera coordinate system defined by the first camera into a third depth image in a second camera coordinate system defined by the second camera; and stitching the third depth image with the second depth image to obtain a stitched image.

19 Claims, 11 Drawing Sheets

(51) Int. Cl.
| | | |
|---|---|---|
| *G06T 7/80* | (2017.01) | |
| *G06T 7/593* | (2017.01) | |
| *H04N 13/246* | (2018.01) | |
| *H04N 13/239* | (2018.01) | |
| *H04N 13/00* | (2018.01) | |

(52) U.S. Cl.
CPC ............ *H04N 13/246* (2018.05); *G06T 2207/10048* (2013.01); *G06T 2207/20076* (2013.01); *H04N 2013/0081* (2013.01)

(56) References Cited

U.S. PATENT DOCUMENTS

| | | | | |
|---|---|---|---|---|
| 8,867,827 | B2* | 10/2014 | Yeatman, Jr. | ........ H04N 13/275 382/154 |
| 9,122,927 | B2 | 9/2015 | Sameer et al. | |
| 10,979,633 | B1* | 4/2021 | Blanchet | ............. H04N 17/002 |
| 2015/0324002 | A1* | 11/2015 | Quiet | .................... G06F 3/0304 463/31 |
| 2017/0214899 | A1* | 7/2017 | Meier | .................. H04N 13/271 |
| 2017/0264882 | A1* | 9/2017 | Heiberg | ............... H04N 5/2624 |
| 2017/0302910 | A1* | 10/2017 | Richards | .............. H04N 13/239 |
| 2018/0322648 | A1* | 11/2018 | Lu | ......................... G06K 9/6269 |
| 2018/0330471 | A1* | 11/2018 | Qin | ........................... G06T 5/50 |
| 2019/0012804 | A1* | 1/2019 | Wang | .................... G06T 3/4038 |
| 2019/0012818 | A1* | 1/2019 | Fine | .................. H04N 5/23296 |
| 2019/0073792 | A1* | 3/2019 | Fletcher | ................. G01C 11/06 |
| 2021/0045852 | A1* | 2/2021 | Atiya | ...................... A61B 1/015 |
| 2021/0152802 | A1* | 5/2021 | Varekamp | ............ H04N 13/243 |

FOREIGN PATENT DOCUMENTS

| | | |
|---|---|---|
| CN | 106454116 A | 2/2017 |
| CN | 106651752 A | 5/2017 |
| CN | 106780592 A | 5/2017 |
| CN | 106780618 A | 5/2017 |
| CN | 107767442 A | 3/2018 |

OTHER PUBLICATIONS

First Office Action in the Chinese Patent Application No. 201810206982.8, dated Nov. 28, 2019; English translation attached.

* cited by examiner

IMAGE STITCHING METHOD, IMAGE STITCHING APPARATUS, DISPLAY APPARATUS, AND COMPUTER PRODUCT

CROSS-REFERENCE TO RELATED APPLICATION

This application is a national stage application under 35 U.S.C. § 371 of International Application No. PCT/CN2018/091810, filed Jun. 19, 2018, which claims priority to Chinese Patent Application No. 201810206982.8, filed Mar. 13, 2018, the contents of which are incorporated by reference in the entirety.

TECHNICAL FIELD

The present invention relates to display technology, more particularly, to an image stitching method, an image stitching apparatus, a display apparatus, and a computer-program product.

BACKGROUND

Gesture interaction has been widely used in computer graphics and related technologies to recognize human body language, and converting the human body language into control commands for operating a device. Gesture interaction, like mouse, keyboard and touchscreen, has become an important method of human-computer interaction.

SUMMARY

In one aspect, the present invention provides an image stitching method, comprising acquiring a first depth image of a present frame of image obtained by a first camera; acquiring a second depth image of the present frame of image obtained by a second camera, the second depth image and the first depth image partially overlapping with each other; converting the first depth image in a first camera coordinate system defined by the first camera into a third depth image in a second camera coordinate system defined by the second camera; and stitching the third depth image with the second depth image to obtain a stitched image.

Optionally, converting the first depth image in the first camera coordinate system defined by the first camera into the third depth image in the second camera coordinate system defined by the second camera comprises determining a mean depth value of one of the first depth image and the second depth image; determining a point cloud space coordinate transformation matrix based on the mean depth value; projecting the first depth image into a first camera coordinate system defined by the first camera to form a first three-dimensional point cloud image in the first camera coordinate system; projecting the first three-dimensional point cloud image into a second camera coordinate system defined by the second camera to form a second three-dimensional point cloud image, based on a point cloud space coordinate transformation matrix and a relationship between the first camera coordinate system and the second camera coordinate system; and transforming the second three-dimensional point cloud image into the third depth image in the second camera coordinate system.

Optionally, prior to acquiring the first depth image and the second depth image, the image stitching method further comprises calibrating the first camera to obtain a first outer parameter matrix of the first camera; calibrating the second camera to obtain a second outer parameter matrix of the second camera; and obtaining the point cloud space coordinate transformation matrix and the relationship between the first camera coordinate system and the second camera coordinate system, based on the first outer parameter matrix and the second outer parameter matrix.

Optionally, calibrating the first camera comprise projecting a calibration image onto a projection plane; capturing at least one first captured image using the first camera at at least one image-capturing angle and at least one image-capturing distance from the projection plane; and calculating the first outer parameter matrix based on the at least one first captured image; wherein calibrating the second camera comprise projecting the calibration image onto a projection plane; capturing at least one second captured image using the second camera at at least one image-capturing angle and at least one image-capturing distance from the projection plane; and calculating the second outer parameter matrix based on the at least one second captured image.

Optionally, determining the mean depth value comprises determining a mean depth value for a first frame of image; wherein determining the mean depth value for the first frame of image comprises calculating a first mean depth value of one of the first depth image and the second depth image using an image segmentation algorithm; obtaining a point cloud space coordinate transformation matrix based on the first depth mean value; and assigning the first mean depth value as an initial value of mean depth value for a next frame of image; wherein an initial value of mean depth value for the first frame of image is set to be zero.

Optionally, determining the mean depth value comprises determining a mean depth value for a N-th frame of image, N is an integer ≥2; wherein determining the mean depth value for the N-th frame of image comprises estimating an estimated N-th depth mean value of one of the first depth image and the second depth image for the N-th frame of image; and comparing the estimated N-th depth mean value with an initial value of mean depth value for the N-th frame of image; wherein a depth mean value for an (N−1)-th frame of image is assigned as the initial value of mean depth value for the N-th frame of image.

Optionally, the image stitching method further comprises assigning a point cloud space coordinate transformation matrix for the (N−1)-th frame of image as a point cloud space coordinate transformation matrix for the N-th frame of image upon a determination that an absolute value of a difference between the estimated N-th depth mean value and the initial value of mean depth value for the N-th frame of image is equal to or less than a threshold value.

Optionally, upon a determination that an absolute value of a difference between the estimated N-th depth mean value and the initial value of mean depth value for the N-th frame of image is greater than a threshold value, the image stitching method further comprises calculating a N-th mean depth value of one of the first depth image and the second depth image for the N-th frame of image using the image segmentation algorithm; obtaining a point cloud space coordinate transformation matrix for the N-th frame of image based on the N-th depth mean value; and assigning the N-th mean depth value as an initial value of mean depth value for an (N+1)-th frame of image.

Optionally, the point cloud space coordinate transformation matrix comprises a rotation matrix and a translation matrix; and the relationship between the first camera coordinate system and the second camera coordinate system is defined by P2=R*P1+T; wherein P2 stands a direction vector of a point in the first three-dimensional point cloud image in the first camera coordinate system; P2 stands a direction vector of a point in the second three-dimensional point cloud image in the second camera coordinate system; R stands for the rotation matrix, and T stands for the translation matrix.

Optionally, stitching the third depth image with the second depth image comprises determining a stitching matrix based on image resolutions of the second depth image and the third depth image; filling the stitching matrix with depth values of pixels of the second depth image based on pixel coordinates of the second depth image; traversing depth values of pixels of the third depth image one by one; filling null space of the stitching matrix with the depth values of pixels of the third depth image corresponding to the null space during traversing; filling non-null space of the stitching matrix with assigned values during traversing; wherein each individual one of the assigned values is selected from a group consisting of a minimum value between a non-null value and a depth value of a pixel of the third depth image corresponding to a same individual non-null space of the stitching matrix, a median value between a non-null value and a depth value of a pixel of the third depth image corresponding to a same individual non-null space of the stitching matrix, and an average value between a non-null value and a depth value of a pixel of the third depth image corresponding to a same individual non-null space of the stitching matrix.

Optionally, subsequent to stitching the third depth image with the second depth image, further comprising filtering the stitched image.

In another aspect, the present invention provides an image stitching apparatus comprising a memory; and one or more processors; wherein the memory and the one or more processors are connected with each other; and the memory stores computer-executable instructions for controlling the one or more processors to acquire a first depth image of a present frame of image obtained by a first camera; acquire a second depth image of the present frame of image obtained by a second camera, the second depth image and the first depth image partially overlapping with each other; convert the first depth image in a first camera coordinate system defined by the first camera into a third depth image in a second camera coordinate system defined by the second camera; and stitch the third depth image with a second depth image to obtain a stitched image.

Optionally, the memory further stores computer-executable instructions for controlling the one or more processors to determine a mean depth value of one of the first depth image and the second depth image; determine a point cloud space coordinate transformation matrix based on the mean depth value; project the first depth image into a first camera coordinate system defined by the first camera to form a first three-dimensional point cloud image in the first camera coordinate system; project the first three-dimensional point cloud image into a second camera coordinate system defined by the second camera to form a second three-dimensional point cloud image, based on a point cloud space coordinate transformation matrix and a relationship between the first camera coordinate system and the second camera coordinate system; and transform the second three-dimensional point cloud image into the third depth image in the second camera coordinate system.

Optionally, the first camera and the second camera are calibrated using a calibration image; and the memory further stores computer-executable instructions for controlling the one or more processors to obtain a first outer parameter matrix of the first camera; obtain a second outer parameter matrix of the second camera; and obtain the point cloud space coordinate transformation matrix and the relationship between the first camera coordinate system and the second camera coordinate system, based on the first outer parameter matrix and the second outer parameter matrix.

Optionally, the first camera is configured to capture at least one first captured image of the calibration image projected onto a projection plane, the at least one first captured image is captured at at least one image-capturing angle and at least one image-capturing distance from the projection plane; the second camera is configured to capture at least one second captured image of the calibration image projected onto the projection plane, the at least one second captured image is captured at at least one image-capturing angle and at least one image-capturing distance from the projection plane; and the memory further stores computer-executable instructions for controlling the one or more processors to calculate the first outer parameter matrix based on the at least one first captured image; and calculate the second outer parameter matrix based on the at least one second captured image.

Optionally, the memory further stores computer-executable instructions for controlling the one or more processors to determine a mean depth value for a first frame of image by calculating a first mean depth value of one of the first depth image and the second depth image using an image segmentation algorithm; obtain a point cloud space coordinate transformation matrix based on the first depth mean value; and assign the first mean depth value as an initial value of mean depth value for a next frame of image; wherein an initial value of mean depth value for the first frame of image is set to be zero.

Optionally, the memory further stores computer-executable instructions for controlling the one or more processors to determine a mean depth value for a N-th frame of image, N is an integer ≥2; wherein the memory further stores computer-executable instructions for controlling the one or more processors to estimate an estimated N-th depth mean value of one of the first depth image and the second depth image for the N-th frame of image; and compare the estimated N-th depth mean value with an initial value of mean depth value for the N-th frame of image; wherein a depth mean value for an (N−1)-th frame of image is assigned as the initial value of mean depth value for the N-th frame of image.

Optionally, the memory further stores computer-executable instructions for controlling the one or more processors to assign a point cloud space coordinate transformation matrix for the (N−1)-th frame of image as a point cloud space coordinate transformation matrix for the N-th frame of image upon a determination that an absolute value of a difference between the estimated N-th depth mean value and the initial value of mean depth value for the N-th frame of image is equal to or less than a threshold value.

Optionally, upon a determination that an absolute value of a difference between the estimated N-th depth mean value and the initial value of mean depth value for the N-th frame of image is greater than a threshold value, the memory further stores computer-executable instructions for controlling the one or more processors to calculate a N-th mean depth value of one of the first depth image and the second depth image for the N-th frame of image using the image segmentation algorithm; obtain a point cloud space coordinate transformation matrix for the N-th frame of image based on the N-th depth mean value; and assign the N-th mean depth value as an initial value of mean depth value for an (N+1)-th frame of image.

Optionally, the point cloud space coordinate transformation matrix comprises a rotation matrix and a translation matrix; and the relationship between the first camera coordinate system and the second camera coordinate system is defined by $P2=R*P1+T$; wherein P2 stands a direction vector of a point in the first three-dimensional point cloud image in the first camera coordinate system; P2 stands a direction vector of a point in the second three-dimensional point cloud image in the second camera coordinate system; R stands for the rotation matrix, and T stands for the translation matrix.

Optionally, for stitching the third depth image with the second depth image, the memory further stores computer-executable instructions for controlling the one or more processors to determine a stitching matrix based on image resolutions of the second depth image and the third depth image; fill the stitching matrix with depth values of pixels of the second depth image based on pixel coordinates of the second depth image; traverse depth values of pixels of the third depth image one by one; fill null space of the stitching matrix with the depth values of pixels of the third depth image corresponding to the null space during traversing; and fill non-null space of the stitching matrix with assigned values during traversing; wherein each individual one of the assigned values is selected from a group consisting of a minimum value between a non-null value and a depth value of a pixel of the third depth image corresponding to a same individual non-null space of the stitching matrix, a median value between a non-null value and a depth value of a pixel of the third depth image corresponding to a same individual non-null space of the stitching matrix, and an average value between a non-null value and a depth value of a pixel of the third depth image corresponding to a same individual non-null space of the stitching matrix.

Optionally, the memory further stores computer-executable instructions for controlling the one or more processors to filter the stitched image.

In another aspect, the present invention provides a display apparatus comprising the image stitching apparatus described herein; a display panel; a first camera configured to obtain the first depth image of the present frame of image; and a second camera configured to obtain the second depth image of the present frame of image.

Optionally, the display apparatus further comprises a transmitter configured to project a calibration image.

Optionally, the transmitter comprises an array of infrared light emitting diodes and a diffusion plate on a light emitting side of the array of infrared light emitting diodes.

Optionally, the transmitter is integrated into the display panel; and the display panel has a plurality of infrared light emitting regions configured to display the calibration image and a plurality of visible light emitting regions configured to display an image of the display apparatus.

Optionally, the display panel comprises a pixel definition layer defining the plurality of visible light emitting regions and the plurality of infrared light emitting regions; the transmitter comprises an array of a plurality of infrared light emitting diodes respectively in the plurality of infrared light emitting regions; and the display panel comprises a plurality of organic light emitting diodes respectively in the plurality of visible light emitting regions.

Optionally, the first camera and the second camera are integrated into the display panel; and each of the first camera and the second camera includes a plurality of infrared photodiodes integrated into the display panel.

Optionally, the display apparatus further comprises a transmitter configured to project a calibration image; wherein the display panel comprises a pixel definition layer defining a plurality of visible light emitting regions, the plurality of infrared light emitting regions, and a plurality of infrared light detecting regions; the display panel comprises a plurality of organic light emitting diodes respectively in the plurality of visible light emitting regions; the transmitter comprises an array of a plurality of infrared light emitting diodes respectively in the plurality of infrared light emitting regions; and the plurality of infrared photodiodes are respectively in the plurality of infrared light detecting regions.

Optionally, the display apparatus further comprises an encapsulating layer encapsulating the plurality of organic light emitting diodes, the plurality of infrared light emitting diodes, and the plurality of infrared photodiodes; and an optical film on a side of the encapsulating layer facing away the plurality of organic light emitting diodes, the plurality of infrared light emitting diodes, and the plurality of infrared photodiodes.

In another aspect, the present invention provides a computer-program product comprising a non-transitory tangible computer-readable medium having computer-readable instructions thereon, the computer-readable instructions being executable by a processor to cause the processor to perform acquiring a first depth image of a present frame of image obtained by a first camera; acquiring a second depth image of the present frame of image obtained by a second camera, the second depth image and the first depth image partially overlapping with each other; converting the first depth image in a first camera coordinate system defined by the first camera into a third depth image in a second camera coordinate system defined by the second camera; and stitching the third depth image with the second depth image to obtain a stitched image.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a gesture interaction process, a gesture of a user is captured. A control command corresponding to the gesture is invoked. In order to accurately capture the gesture of the user, typically a plurality of cameras are used in order to avoid blind spots. The plurality of cameras are configured to capture a plurality of images, which are to be stitched together to obtain a stitched image. Typically, a stitching process involves a process of identifying feature matching points in the overlapping regions of the plurality of images, using a differential algorithm, which demands a large amount of computation resources. The stitching process is slow and inefficient.

Accordingly, the present disclosure provides, inter alia, an image stitching method, an image stitching apparatus, a display apparatus, and a computer-program product that substantially obviate one or more of the problems due to limitations and disadvantages of the related art. In one aspect, the present disclosure provides an image stitching method. In some embodiments, the image stitching method includes acquiring a first depth image of a present frame of image obtained by a first camera; acquiring a second depth image of the present frame of image obtained by a second camera, the second depth image and the first depth image partially overlapping with each other; converting the first depth image in a first camera coordinate system defined by the first camera into a third depth image in a second camera coordinate system defined by the second camera; and stitching the third depth image with the second depth image to obtain a stitched image. As used herein, the term "stitching" or "stitched image" relates to a process that combines two or more source images into one composite result image. The process is useful when a camera field of view is too small to capture the entire desired scene and multiple images are required.

Figure 1:
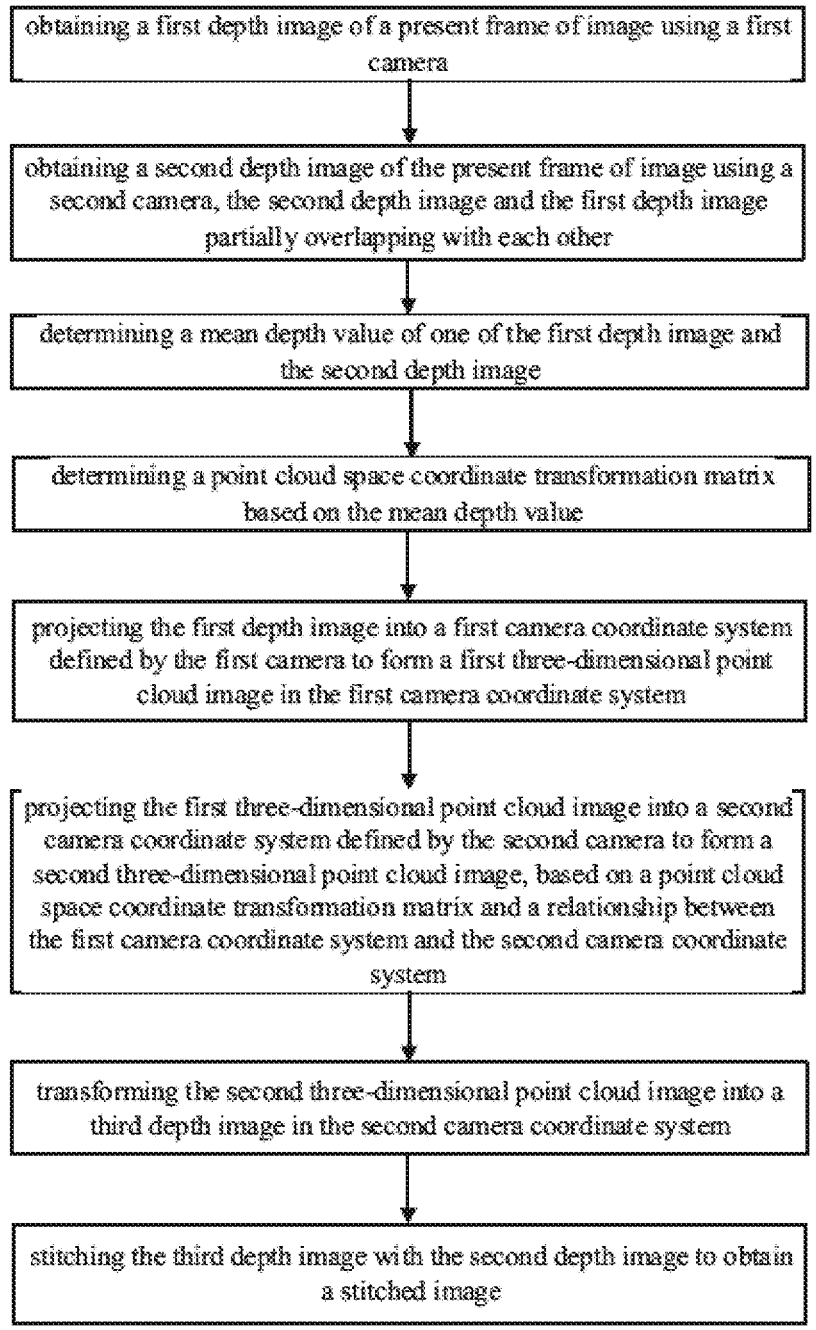
FIG. 1 is a flow chart illustrating an image stitching method in some embodiments according to the present disclosure.

FIG. 1 is a flow chart illustrating an image stitching method in some embodiments according to the present disclosure. Referring to FIG. 1, the image stitching method in some embodiments includes acquiring a first depth image of a present frame of image obtained by a first camera; acquiring a second depth image of the present frame of image obtained by a second camera, the second depth image and the first depth image partially overlapping with each other; determining a mean depth value of one of the first depth image and the second depth image; determining a point cloud space coordinate transformation matrix based on the mean depth value; projecting the first depth image into a first camera coordinate system defined by the first camera to form a first three-dimensional point cloud image in the first camera coordinate system; projecting the first three-dimensional point cloud image into a second camera coordinate system defined by the second camera to form a second three-dimensional point cloud image, based on a point cloud space coordinate transformation matrix and a relationship between the first camera coordinate system and the second camera coordinate system; transforming the second three-dimensional point cloud image into a third depth image in the second camera coordinate system; and stitching the third depth image with the second depth image to obtain a stitched image.

Figure 2:
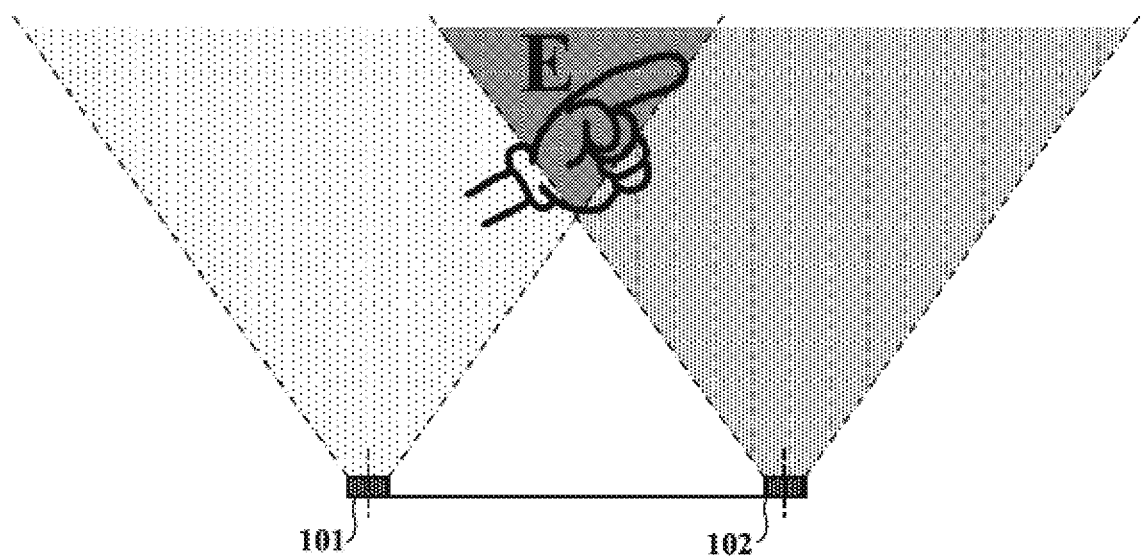
FIG. 2 is a schematic diagram of image stitching in some embodiments according to the present disclosure.

FIG. 2 is a schematic diagram of image stitching in some embodiments according to the present disclosure. Referring to FIG. 2, the first camera 101 is configured to obtain the first depth image, the second camera 102 is configured to obtain the second depth image. The first depth image is within the shooting range of the first camera 101 and the second depth image is within the shooting range of the second camera 102. The first depth image and the second depth image partially overlap with each other, forming an overlapping region E. Thus, the first depth image and the second depth image need to be stitched in the overlapping region E.

Figure 3:
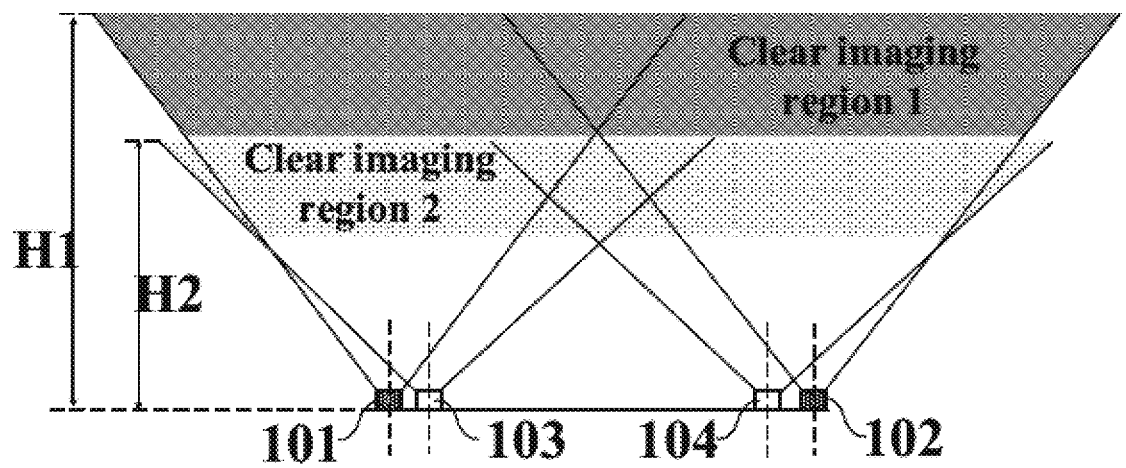
FIG. 3 illustrates imaging regions of depth cameras having different longitudinal depths of field in some embodiments according to the present disclosure.

In order to stitch the first depth image and the second depth image, maximum longitudinal depths of field of the two cameras need to be approximately in a same range so that the overlapping region may be formed. FIG. 3 illustrates imaging regions of depth cameras having different longitudinal depths of field in some embodiments according to the present disclosure. Referring to FIG. 3, each of the first camera 101 and the second camera 102 has a maximum longitudinal depth of H1, each forming a clear image in a clear imaging region 1. Each of the third camera 103 and the fourth camera 104 has a maximum longitudinal depth of H2, each forming a clear image in a clear imaging region 2. The clear imaging region 1 has a greater depth of field than the clear imaging region 2.

In some embodiments, the mean depth value is an average value of depth values corresponding to points in one of the first depth image or the second depth image. Depth values of the first depth image or the second depth image in a same frame of image differ from each other only minimally, thus the mean depth value may be obtained by averaging depth values corresponding to points in either one of the first depth image or the second depth image. Optionally, the mean depth value is an average value of depth values corresponding to points in the first depth image. Optionally, the mean depth value is an average value of depth values corresponding to points in the second depth image.

In some embodiments, a conversion between the first camera coordinate system defined by the first camera and the second camera coordinate system defined by the second camera can be achieved using the point cloud space coordinate transformation matrix and the relationship between the first camera coordinate system and the second camera coordinate system. Optionally, the point cloud space coordinate transformation matrix comprises a rotation matrix R and a translation matrix T. Optionally, the rotation matrix R is a 3*3 matrix and the translation matrix T is a 1*3 column vector. Optionally, the relationship between the first camera coordinate system and the second camera coordinate system is defined by Equation (1):

$$P2 = R*P1 + T \qquad (1)$$

wherein P2 stands a direction vector of a point in the first three-dimensional point cloud image in the first camera coordinate system; P2 stands a direction vector of a point in the second three-dimensional point cloud image in the second camera coordinate system; R stands for the rotation matrix, and T stands for the translation matrix. Optionally, P1 is a 1*3 column vector, e.g., (X, Y, Z). X and Y are respectively coordinates of a point along a x axis and a y axis in the first camera coordinate system defined by the first camera, and Z is a depth value d of the point in the first camera coordinate system defined by the first camera. Optionally, P2 is a 1*3 column vector, e.g., (X', Y', Z'). X' and Y' are respectively coordinates of a point along a x axis and a y axis in the second camera coordinate system defined by the second camera, and Z' is a depth value d of the point in the second camera coordinate system defined by the second camera.

In some embodiments, a point in the first depth image can be converted into a point in the first three-dimensional point cloud image in the first camera coordinate system according to Equation (2), Equation (3), and Equation (4);

$$X = \left(\frac{x}{X_{res}} - 0.5\right) * \tan\left(\frac{FOV_h}{2}\right) * 2 * d; \qquad (2)$$

$$Y = \left(\frac{y}{Y_{res}} - 0.5\right) * \tan\left(\frac{FOV_v}{2}\right) * 2 * d; \qquad (3)$$

$$Z = d; \qquad (4)$$

wherein x stands for a coordinate of a point along a x axis in the first depth image; y stands for a coordinate of the point along a y axis in the first depth image; Xres is a resolution along the x axis in the first camera coordinate system; Xres is a constant, for example, 320; Yres is a resolution along the y axis of the first camera coordinate system, and Yres is also a constant, for example, 240; d is the depth value of the point in the first depth image; FOV stands for field of view of the first camera, FOVh stands for a horizontal field of view of the first camera, FOVv stands for a vertical field of view of the first camera. Optionally, the field of view, including FOVh and FOVv, are fixed parameters of the first camera.

The second three-dimensional point cloud image formed by projecting the first three-dimensional point cloud image into the second camera coordinate system defined by the second camera is a three-dimensional point cloud image in the second camera coordinate system defined by the second camera. P2 in Equation (1) is a direction vector of a point in the second three-dimensional point cloud image in the second camera coordinate system.

In some embodiments, transforming the second three-dimensional point cloud image into the third depth image in the second camera coordinate system can be performed according to Equation (5), Equation (6), and Equation (7):

$$X' = \left(\frac{x'}{X'_{res}} - 0.5\right) * \tan\left(\frac{FOV'_h}{2}\right) * 2 * d; \qquad (5)$$

$$Y' = \left(\frac{y'}{Y'_{res}} - 0.5\right) * \tan\left(\frac{FOV'_v}{2}\right) * 2 * d; \qquad (6)$$

$$Z' = d'; \qquad (7)$$

wherein x' stands for a coordinate of a point along a x axis in the second depth image; y' stands for a coordinate of the point along a y axis in the second depth image; X'res is a resolution along the x axis in the second camera coordinate system; X'res is a constant, for example, 320; Yres is a resolution along the y axis of the second camera coordinate system, and Yres is also a constant, for example, 240; d' is the depth value of the point in the second depth image; FOV' stands for field of view of the second camera, FOV'h stands for a horizontal field of view of the second camera, FOVv stands for a vertical field of view of the second camera. Optionally, the field of view, including FOV'h and FOV'v, are fixed parameters of the second camera.

In the present image stitching method, a first depth image and a second depth image are respectively obtained using a first camera and a second camera; the first depth image is then projected into a first camera coordinate system defined by the first camera to form a first three-dimensional point cloud image in the first camera coordinate system; the first three-dimensional point cloud image is then projected into a second camera coordinate system defined by the second camera to form a second three-dimensional point cloud image; subsequently the second three-dimensional point cloud image is transformed into a third depth image in the second camera coordinate system. The third depth image and the second depth image are both in the second camera coordinate system defined by the second camera. The third depth image (converted from the first depth image which is in a different coordinate system) and the second depth image can be directly stitched. The present image stitching method does not require a differential algorithm to obtain the feature matching points of the two depth images in the overlapping area, obviating the requirement of a large amount of computation resources, the stitching process can be performed in a fast and efficient manner.

Moreover, in the present image stitching method, a depth image captured by the camera with any depth within the maximum longitudinal depth of field of the camera can be easily converted into a point cloud image, the present image stitching method is not restrictive in terms of its requirement on the depth of the depth image.

Figure 4:
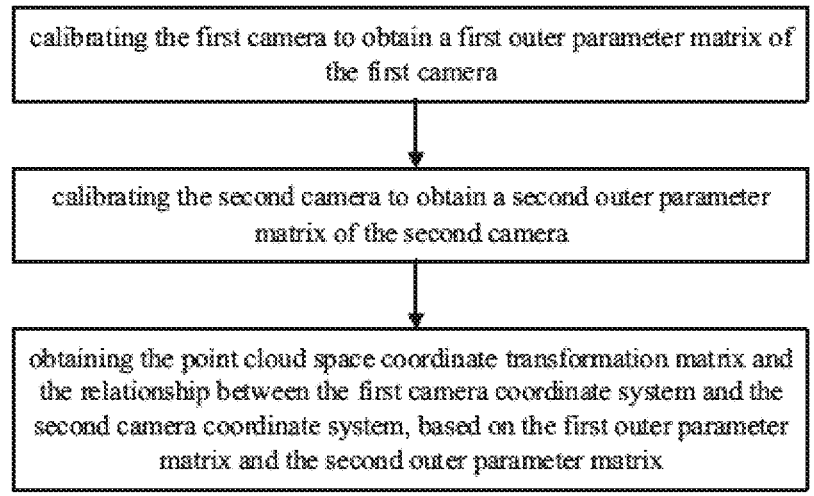
FIG. 4 is a flow chart illustrating a step for acquiring a point cloud coordinate transformation matrix of an image stitching method in some embodiments according to the present disclosure.

In some embodiments, prior to acquiring the first depth image and the second depth image, the method further includes calibrating the cameras. FIG. 4 is a flow chart illustrating a step for acquiring a point cloud coordinate transformation matrix of an image stitching method in some embodiments according to the present disclosure. Referring to FIG. 4, the step for acquiring a point cloud coordinate transformation matrix of an image stitching method in some embodiments includes calibrating the first camera to obtain a first outer parameter matrix of the first camera; calibrating the second camera to obtain a second outer parameter matrix of the second camera; and obtaining the point cloud space coordinate transformation matrix and the relationship between the first camera coordinate system and the second camera coordinate system, based on the first outer parameter matrix and the second outer parameter matrix. By calibrating the first camera and the second camera, the first depth image can be converted into the third depth image with an enhanced accuracy.

Specifically, the first outer parameter matrix can be expressed as a first rotation sub-matrix R1 and a first translation sub-matrix T1, and the second outer parameter matrix can be expressed as a second rotation sub-matrix R2 and a second translation sub-matrix T2. Optionally, a relationship between a point Pw in a spatial coordinate system and an imaging point P1 in the first coordinate system defined by the first camera can be expressed according to Equation (8):

$$P1 = R1*Pw + T1 \qquad (8).$$

Optionally, a relationship between a point Pw in a spatial coordinate system and an imaging point P2 in the second coordinate system defined by the second camera can be expressed according to Equation (9):

$$P2 = R2*Pw + T2 \qquad (9).$$

Equation (10) can be derived from Equation (8):

$$Pw = R1^{-1}*(P1 - T1) \qquad (10).$$

By combining Equation (10) and Equation (9), the following Equation (11) can be obtained:

$$P2 = R2*(R1^{-1}*(P1-T1)) + T2 = R2*R1^{-1}*P1 + T2 - R2*R1^{-1}*T1 \qquad (11).$$

Based on the first outer parameter matrix and the second outer parameter matrix, the point cloud space coordinate transformation matrix and the relationship between the first camera coordinate system and the second camera coordinate system can be obtained, e.g., Equation (1)) can be derived. Specifically, the rotation matrix R and the translation matrix T of the point cloud space coordinate transformation matrix can be obtained by comparing Equation (11) with Equation (1), and the relationship between the first camera coordinate system and the second camera coordinate system can be determined. From Equation (11) and Equation (1), Equation (12) and Equation (13) can be derived:

$$R = R2*R1^{-1} \qquad (12).$$

$$T = T2 - R2*R1^{-1}*T1 \qquad (13).$$

Figure 5:
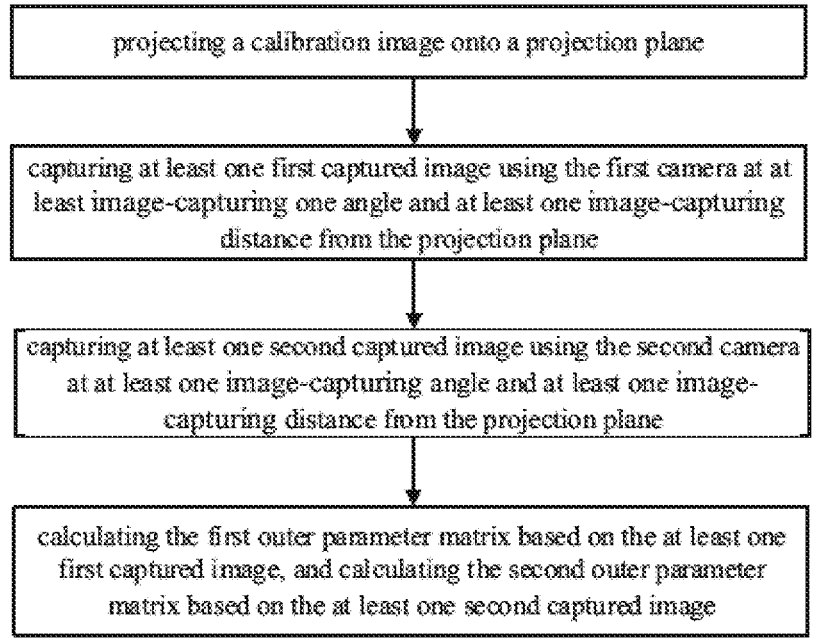
FIG. 5 is a flow chart illustrating certain steps of an image stitching method in some embodiments according to the present disclosure.

FIG. 5 is a flow chart illustrating certain steps of an image stitching method in some embodiments according to the present disclosure. Referring to FIG. 5, the step of calibrating the first camera in some embodiments includes projecting a calibration image onto a projection plane; capturing at least one first captured image using the first camera at at least one image-capturing angle and at least one image-capturing distance from the projection plane; and calculating the first outer parameter matrix based on the at least one first captured image. The step of calibrating the second camera in some embodiments includes projecting the calibration image onto a projection plane; capturing at least one second captured image using the second camera at at least one image-capturing angle and at least one image-capturing distance from the projection plane; and calculating the second outer parameter matrix based on the at least one second captured image.

Figure 6:
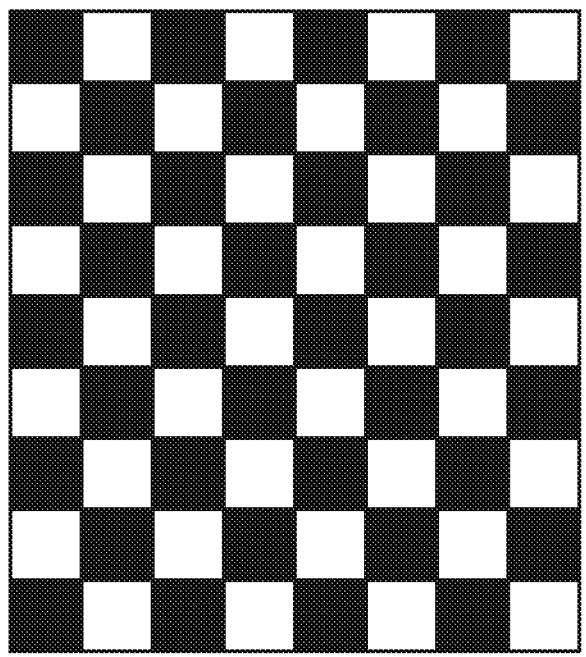
FIG. 6 is a schematic diagram of a calibration image in some embodiments according to the present disclosure.
Figure 7:
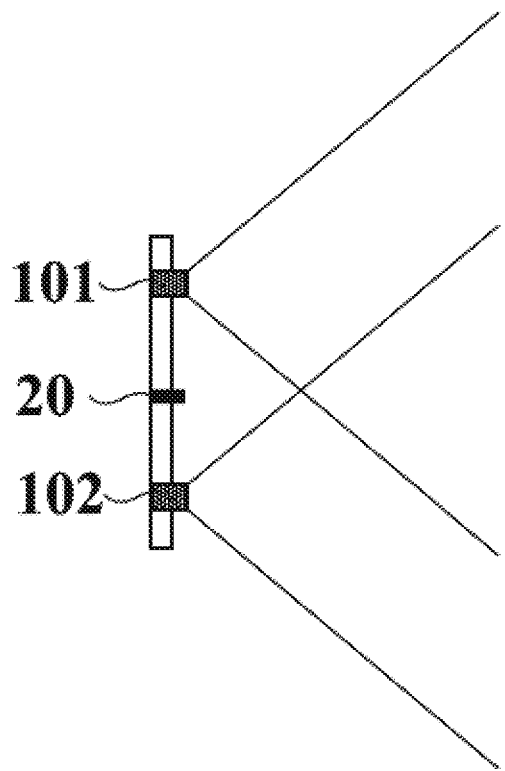
FIG. 7 is a schematic diagram of a structure having two depth cameras and a transmitter in some embodiments according to the present disclosure.

FIG. 6 is a schematic diagram of a calibration image in some embodiments according to the present disclosure. Referring to FIG. 6, the calibration image in some embodiments is an image having a chessboard pattern. The calibration image may be generated by a transmitter. FIG. 7 is a schematic diagram of a structure having two depth cameras and a transmitter in some embodiments according to the present disclosure. Referring to FIG. 7, a transmitter 20 is configured to generate the calibration image, which is detected by the first camera 101 and the second camera 102. Optionally, the projection plane may be a white projection screen, e.g., a white wall surface.

Figure 8:
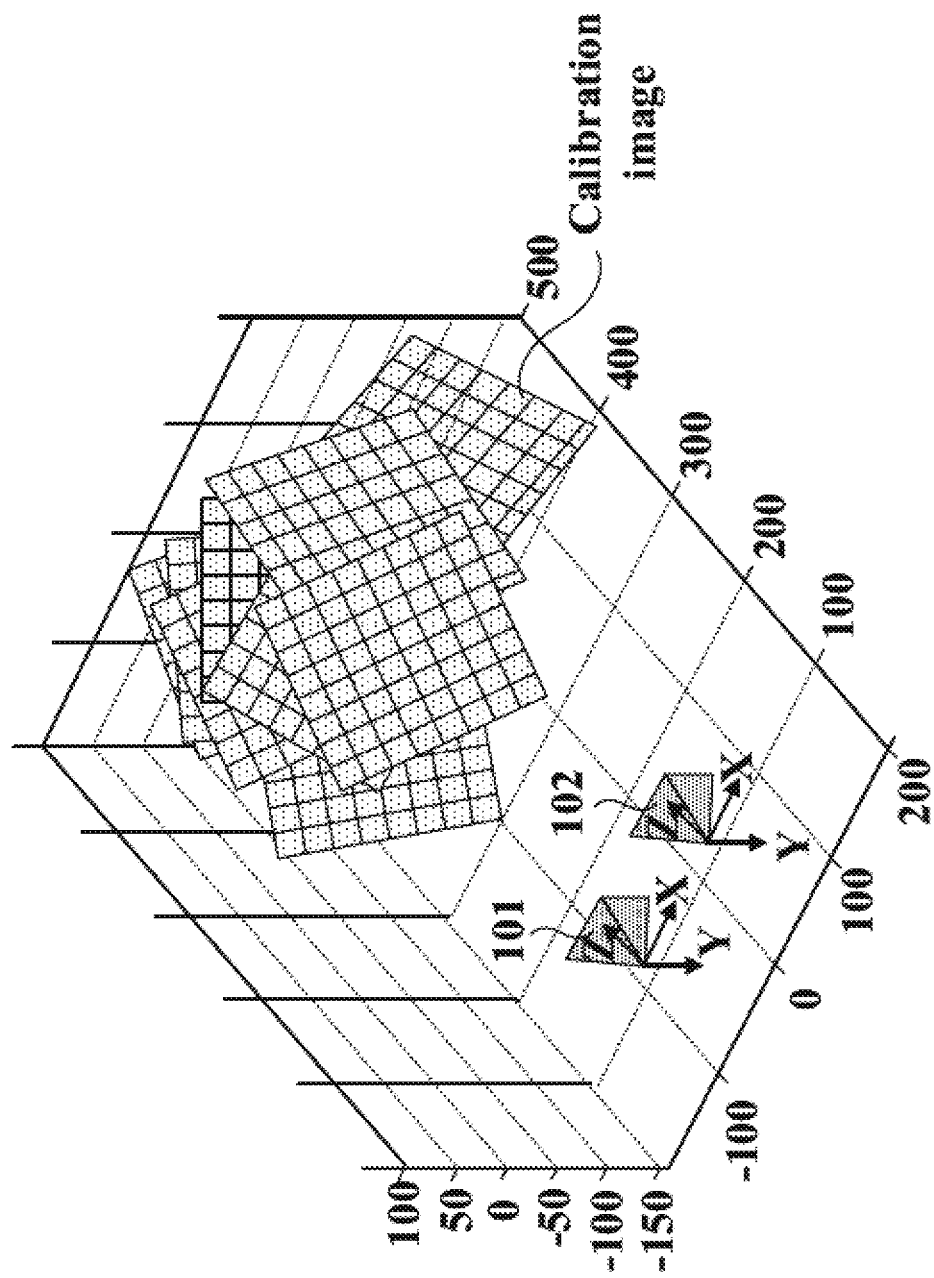
FIG. 8 illustrates a calibration process of an image stitching method in some embodiments according to the present disclosure.

FIG. 8 illustrates a calibration process of an image stitching method in some embodiments according to the present disclosure. Referring to FIG. 8, in a same spatial coordinate system (the unit of the coordinate value is cm), the first camera 101 and the second camera 102 capture a plurality of checkerboard images (calibration images).

Optionally, the first outer parameter matrix is expressed as the first rotation sub-matrix R1 and the first translation sub-matrix T1. Optionally, the second outer parameter matrix is expressed as the second rotation sub-matrix R2 and the second translation sub-matrix T2.

In the present image stitching method, the calibration image can be generated by a transmitter, obviating the need of a calibration plate. Whenever an installation position of the camera undergoes a change in response to an external environment change, the camera can be simply calibrated by projecting the calibration image using the transmitter. The calibration of the camera can be achieved before the acquisition of the gesture image, improving the accuracy of gesture acquisition and gesture image stitching.

Moreover, the frequency of the calibration process is not limited in this application, the calibration process can be performed as frequent as desired. For example, the camera can be calibrated in a human-computer interaction device having the transmitter and at least the first camera and the second camera, whenever the human-computer interaction device is turned on. In another example, the camera can be calibrated whenever a gesture is acquired, e.g., if the device has been turned on for a long time. In another example, the camera can be calibrated according to a user-defined schedule.

The first rotation sub-matrix R1 and the first translation sub-matrix T1 change in response to a change in an image capturing distance of the first camera. For example, the first rotation sub-matrixes R1 and the first translation sub-matrixes T1 corresponding to two different image capturing distances (particularly when the image capturing distances have a relatively large difference) are different. The second rotation sub-matrix R2 and the second translation sub-matrix T2 change in response to a change in an image capturing distance of the second camera. For example, the second rotation sub-matrixes R2 and the second translation sub-matrixes T2 corresponding to two different image capturing distances (particularly when the image capturing distances have a relatively large difference) are different. By using a same transmitter and a same calibration image, the image capturing distances for the first camera and the second camera can be substantially the same. As a result, a mean depth value for the first depth image and a mean depth value for the second depth image can be substantially the same. In determining the point cloud space coordinate transformation matrix, the mean depth value of either one of the first depth image and the second depth image can be used.

Based on Equation (12) and Equation (13) above, the point cloud space coordinate transformation matrix (including the rotation matrix R and the translation matrix T) can be derived from the first rotation sub-matrix R1, the first translation sub-matrix T1, the second rotation sub-matrix R2, and the second translation sub-matrix T2. Thus, it follows that the rotation matrix R and the translation matrix T are correlated with the imaging capturing distances of the first camera and the second camera. The rotation matrix R and the translation matrix T change in response to a change in image capturing distances of the first camera and the second camera. When the image capturing distances of the first camera and the second camera undergo a large change, the rotation matrix R and the translation matrix T of the point cloud space coordinate transformation matrix become different.

Figure 9:
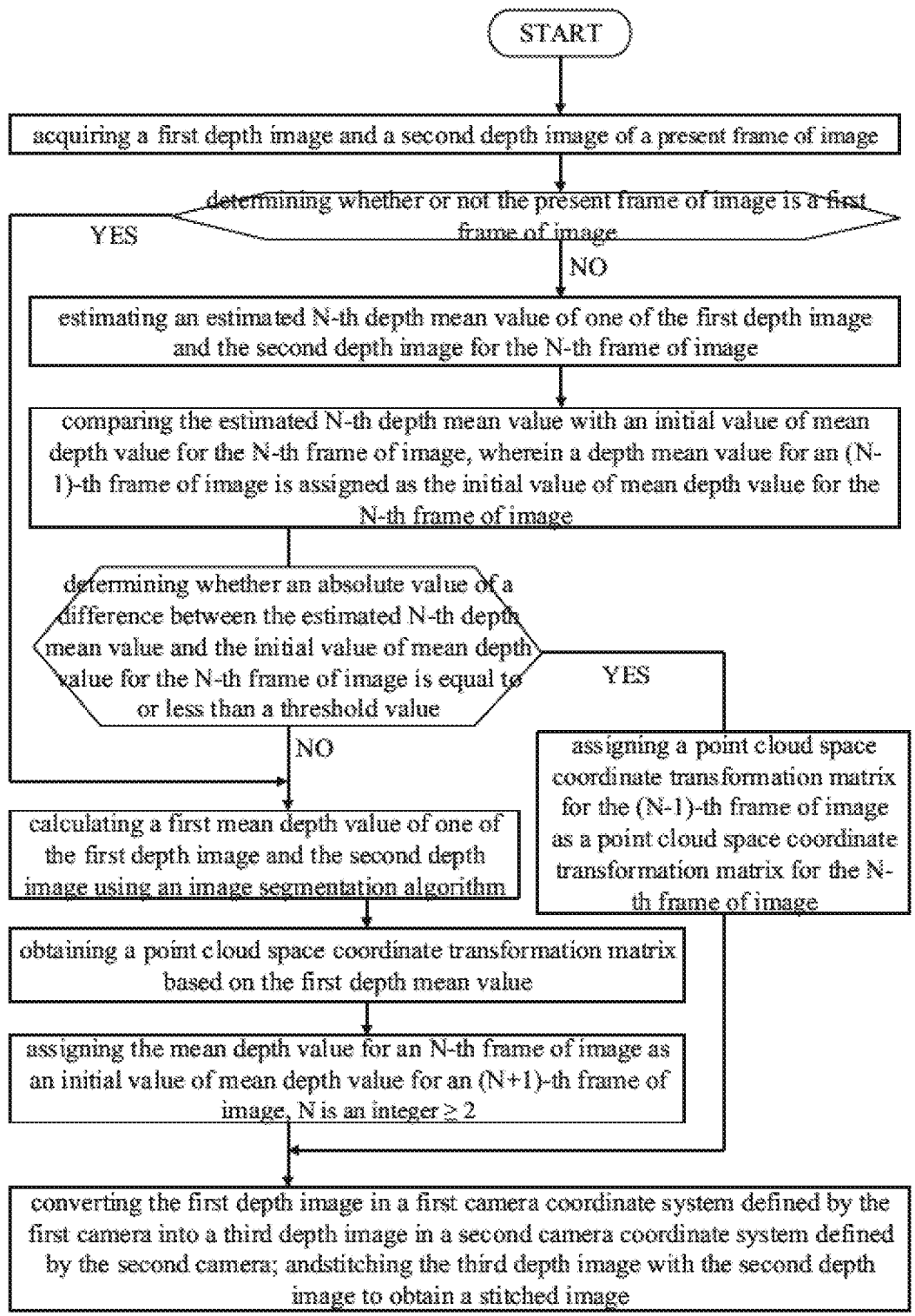
FIG. 9 is a flow chart illustrating an image stitching method in some embodiments according to the present disclosure.

FIG. 9 is a flow chart illustrating an image stitching method in some embodiments according to the present disclosure. Referring to FIG. 9, the method includes acquiring a first depth image and a second depth image of a present frame of image. For example, the first depth image of the present frame of image may be obtained by a first camera, and the second depth image of the present frame of image may be obtained by a second camera. The method then includes a step of determining whether or not the present frame of image is a first frame of image. When it is determined that the present frame of image is the first frame of image, the method includes determining a mean depth value for the first frame of image. Specifically, the step of determining the mean depth value for the first frame of image includes calculating a first mean depth value of one of the first depth image and the second depth image using an image segmentation algorithm; obtaining a point cloud space coordinate transformation matrix based on the first depth mean value; and assigning the mean depth value for an N-th frame of image as an initial value of mean depth value for an (N+1)-th frame of image (N is an integer ≥2; e.g., assigning the first mean depth value as an initial value of mean depth value for a next frame of image). Optionally, an initial value of mean depth value for the first frame of image is set to be zero.

Specifically, the mean depth value can be compared to an initial value of the mean depth value of the present frame of image. For example, the mean depth value of the first frame of image can be compared to the initial value of the mean depth value of the first frame of image (which optionally is set to zero). Based on a result of the comparison, the point cloud space coordinate transformation matrix can be accordingly obtained. For example, two different point cloud space coordinate transformation matrixes respectively correspond to two different mean depth values. In one example, two different point cloud space coordinate transformation matrixes respectively correspond a mean depth value equal to or less than 50 cm and a mean depth value greater than 50 cm but equal to or less than 1 meter. Optionally, the initial value of the mean depth value is set to be 50 cm.

In one example, the present frame of image is the first frame of image, the mean depth value is determined to be 60 cm, and the initial value of the mean depth value is zero. Thus, the difference between the mean depth value calculated and the initial value of the mean depth value is 60 cm, which is greater than a threshold value, 50 cm. According, the point cloud space coordinate transformation matrix corresponding to the mean depth value greater than 50 cm but equal to or less than 1 meter is selected. In another example, the present frame of image is the first frame of image, the mean depth value is determined to be 20 cm, and the initial value of the mean depth value is zero. Thus, the difference between the mean depth value calculated and the initial value of the mean depth value is 20 cm, which is less than the threshold value, 50 cm. According, the point cloud space coordinate transformation matrix corresponding to the mean depth value equal to or less than 50 cm is selected.

In the camera calibration process, as discussed above, the rotation matrix R and the translation matrix T are correlated with the imaging capturing distances of the first camera and the second camera. The rotation matrix R and the translation matrix T change in response to a change in image capturing distances of the first camera and the second camera. When the image capturing distances of the first camera and the second camera undergo a large change, the rotation matrix R and the translation matrix T of the point cloud space coordinate transformation matrix become different. Similarly, in a gesture detecting process, a distance between a user gesture and the camera also undergoes change depending on the user's gesture. Accordingly, a point cloud space coordinate transformation matrix matching the distance between the user gesture and the camera is selected, in order to more accurately detect the user gesture. Thus, when the present frame of image is not the first frame of image, optionally the method includes a step of determining whether the distance between the user gesture and the camera (e.g., the first camera and the second camera) undergoes a relatively large change, and if so, a different point cloud space coordinate transformation matrix is selected.

Referring to FIG. 9, when it is determined that the present frame of image is not the first frame of image, e.g., when it is determined that the present frame of image is a N-th frame of image, N is an intege r≥2, the step of determining the mean depth value includes determining a mean depth value for a N-th frame of image, N is an integer ≥2. Optionally, the step of determining the mean depth value for the N-th frame of image includes estimating an estimated N-th depth mean value of one of the first depth image and the second depth image for the N-th frame of image; and comparing the estimated N-th depth mean value with an initial value of mean depth value for the N-th frame of image. Optionally, a depth mean value for an (N−1)-th frame of image is assigned as the initial value of mean depth value for the N-th frame of image, N is an integer ≥2.

Optionally, upon a determination that an absolute value of a difference between the estimated N-th depth mean value and the initial value of mean depth value for the N-th frame of image is equal to or less than a threshold value, the image stitching method further includes assigning a point cloud space coordinate transformation matrix for the (N−1)-th frame of image as a point cloud space coordinate transformation matrix for the N-th frame of image.

In one example, the depth mean value for the (N−1)-th frame of image is 20 cm, which is assigned as the initial value of mean depth value for the N-th frame of image. When a distance between the user gesture and the camera does not undergo a large change (e.g., the change is less than or equal to a threshold distance), the absolute value of the difference between the estimated N-th depth mean value and the initial value of mean depth value for the N-th frame of image is equal to or less than a threshold value. For example, the threshold value is 50 cm, the estimated N-th depth mean value is 20 cm, and the initial value of mean depth value for the N-th frame of image is also 20 cm, then the absolute value of the difference is zero, which is less than the threshold value, 50 cm. Accordingly, the point cloud space coordinate transformation matrix for the (N−1)-th frame of image is assigned as the point cloud space coordinate transformation matrix for the N-th frame of image. Because the point cloud space coordinate transformation matrix for the (N−1)-th frame of image is a point cloud space coordinate transformation matrix corresponding to the mean depth value equal to or less than 50 cm, the same point cloud space coordinate transformation matrix is also selected for the N-th frame of image.

Optionally, upon a determination that an absolute value of a difference between the estimated N-th depth mean value and the initial value of mean depth value for the N-th frame of image is greater than a threshold value, the image stitching method further includes calculating a N-th mean depth value of one of the first depth image and the second depth image for the N-th frame of image using the image segmentation algorithm; obtaining a point cloud space coordinate transformation matrix for the N-th frame of image based on the N-th depth mean value; and assigning the N-th mean depth value as an initial value of mean depth value for an (N+1)-th frame of image.

In one example, the depth mean value for the (N−1)-th frame of image is 20 cm, which is assigned as the initial value of mean depth value for the N-th frame of image. Thus, the initial value of mean depth value for the N-th frame of image is also 20 cm. The threshold value is 50 cm, the estimated N-th depth mean value is 80 cm, then it follows the absolute value of the difference would be 80−20=60 cm, which is greater than the threshold value, 50 cm. This indicates that a distance between the user gesture and the camera undergoes a large change (e.g., the change is greater than a threshold distance). In this scenario, the method uses the image segmentation algorithm to calculate the N-th mean depth value (e.g., to determine the depth of the user gesture). A point cloud space coordinate transformation matrix for the N-th frame of image is re-selected based on the N-th depth mean value calculated using the image segmentation algorithm. Once the point cloud space coordinate transformation matrix for the N-th frame of image is determined, the method further includes converting the first depth image in a first camera coordinate system defined by the first camera into a third depth image in a second camera coordinate system defined by the second camera; and stitching the third depth image with the second depth image to obtain a stitched image, as discussed above.

When the depth of the user gesture does not change much, the point cloud space coordinate transformation matrix for a previous frame of image can be re-used in the present frame of image. By having this design, the image stitching process can be simplified, placing even less demand on the computation resource.

Figure 10:
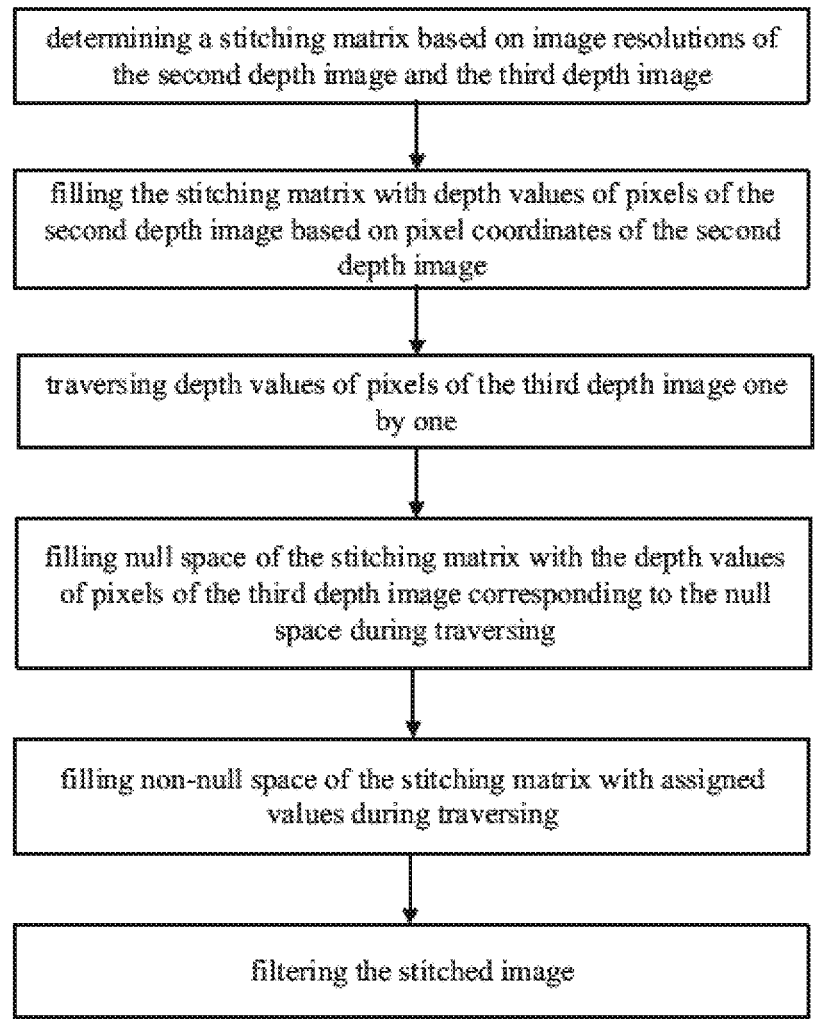
FIG. 10 is a flow chart illustrating a stitching step of an image stitching method in some embodiments according to the present disclosure.
Figure 11:
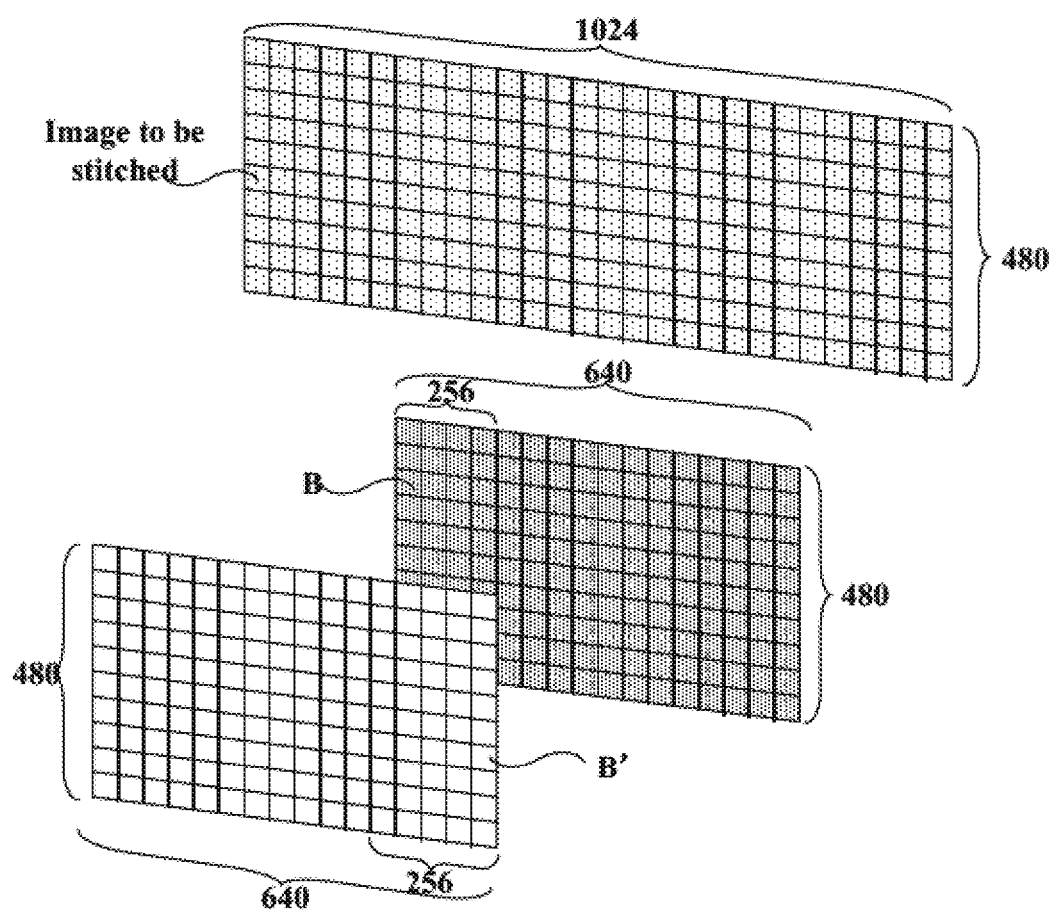
FIG. 11 illustrates a process of stitching two depth images into a stitched image in some embodiments according to the present disclosure.

FIG. 10 is a flow chart illustrating a stitching step of an image stitching method in some embodiments according to the present disclosure. Referring to FIG. 10, the stitching step of the image stitching method in some embodiments includes determining a stitching matrix based on image resolutions of the second depth image and the third depth image. Optionally, this step includes determining image resolutions of the second depth image and the third depth image, and selecting a stitching matrix that matches with the image resolutions. FIG. 11 illustrates a process of stitching two depth images into a stitched image in some embodiments according to the present disclosure. Referring to FIG. 11, the image resolutions for the second depth image B and the third depth image B' are both 640×480 (length×height). The image resolution of the image to be stitched is 1024× 480. Thus, the stitching matrix would include 1024×480 values, each of which corresponding to a depth value of a point in the image to be stitched. It follows that, in stitching the second depth image B and the third depth image B', there are 640×2−1024=256 columns of pixels, i.e., a total of 256×480 pixels from the second depth image B and the third depth image B' that need to be stitched.

Referring to FIG. 10 again, the step of stitching the third depth image with the second depth image in some embodiments further includes filling the stitching matrix with depth values of pixels of the second depth image based on pixel coordinates of the second depth image. For example, depth values of pixels of the second depth image can be filled on right half of the stitching matrix.

Referring to FIG. 10 again, the step of stitching the third depth image with the second depth image in some embodiments further includes traversing depth values of pixels of the third depth image one by one; and filling null space of the stitching matrix with the depth values of pixels of the third depth image corresponding to the null space during traversing. For example, during traversing, the depth values of pixels of the third depth image at positions corresponding to the null space of the stitching matrix can be filled on left half of the stitching matrix (where the null space is at).

Referring to FIG. 10 again, the step of stitching the third depth image with the second depth image in some embodiments further includes filling non-null space of the stitching matrix with assigned values during traversing. Various appropriate assigned values can be used in this step. Optionally, each individual one of the assigned values is a minimum value between a non-null value and a depth value of a pixel of the third depth image corresponding to a same individual non-null space of the stitching matrix. Optionally, each individual one of the assigned values is a median value between a non-null value and a depth value of a pixel of the third depth image corresponding to a same individual non-null space of the stitching matrix. Optionally, each individual one of the assigned values is an average value between a non-null value and a depth value of a pixel of the third depth image corresponding to a same individual non-null space of the stitching matrix.

The value in the stitching matrix corresponds to a depth value of the corresponding pixel at this position. The greater the value in a point of the stitching matrix, the greater the depth of field at this point, and vice versa. In some embodiments, during the process of traversing depth values of pixels of the third depth image one by one, if a point of the stitching matrix has already been filled with a non-null value (e.g., filled with a depth value of a pixel in the second depth image corresponding to this point), the method compares the non-null value already filled at this point with the depth value of the pixel of the third depth image corresponding to a same individual non-null space of the stitching matrix, and finds a lesser value between the two. The lesser value is then filled at this point. In one example, the non-null value already filled at this point is the lesser value, then the non-null value already filled at this point remains at this point. In another example, the depth value of the pixel of the third depth image corresponding to the same individual non-null space of the stitching matrix is the lesser value, then the depth value of the pixel of the third depth image corresponding to the same individual non-null space is used to fill this point in the stitching matrix. The rationale behind this is that an image having a greater depth of field is blocked by another image having a smaller depth of field, and cannot be seen.

The stitching process involves coordinate system conversion, thus the stitching process may generate voids at positions corresponding to the stitching positions. Referring to FIG. 10, the stitching step in some embodiments further includes filtering the stitched image, thereby removing the voids at positions corresponding to the stitching positions. In one example, the filtering step is performed by a median filtering process, thereby removing the voids, e.g., by blur removal.

In another aspect, the present disclosure provides an image stitching apparatus. In some embodiments, the image stitching apparatus includes a memory; and one or more processors. Optionally, the memory and the one or more processors are connected with each other; and the memory stores computer-executable instructions for controlling the one or more processors to acquire a first depth image of a present frame of image obtained by a first camera; acquire a second depth image of the present frame of image obtained by a second camera, the second depth image and the first depth image partially overlapping with each other; convert the first depth image in a first camera coordinate system defined by the first camera into a third depth image in a second camera coordinate system defined by the second camera; and stitch the third depth image with a second depth image to obtain a stitched image.

Various appropriate memory may be used in the present virtual image display apparatus. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory. Various appropriate processors may be used in the present virtual image display apparatus. Examples of appropriate processors include, but are not limited to, a general-purpose processor, a central processing unit (CPU), a microprocessor, a digital signal processor (DSP), a controller, a microcontroller, a state machine, etc.

In some embodiments, the memory further stores computer-executable instructions for controlling the one or more processors to determine a mean depth value of one of the first depth image and the second depth image; determine a point cloud space coordinate transformation matrix based on the mean depth value; project the first depth image into a first camera coordinate system defined by the first camera to form a first three-dimensional point cloud image in the first camera coordinate system; project the first three-dimensional point cloud image into a second camera coordinate system defined by the second camera to form a second three-dimensional point cloud image, based on a point cloud space coordinate transformation matrix and a relationship between the first camera coordinate system and the second camera coordinate system; and transform the second three-dimensional point cloud image into the third depth image in the second camera coordinate system.

Optionally, the first camera and the second camera are calibrated using a calibration image; and the memory further stores computer-executable instructions for controlling the one or more processors to obtain a first outer parameter matrix of the first camera; obtain a second outer parameter matrix of the second camera; and obtain the point cloud space coordinate transformation matrix and the relationship between the first camera coordinate system and the second camera coordinate system, based on the first outer parameter matrix and the second outer parameter matrix.

Optionally, the first camera is configured to capture at least one first captured image of the calibration image projected onto a projection plane, the at least one first captured image is captured at at least one image-capturing angle and at least one image-capturing distance from the projection plane; the second camera is configured to capture at least one second captured image of the calibration image projected onto the projection plane, the at least one second captured image is captured at at least one image-capturing angle and at least one image-capturing distance from the projection plane; and the memory further stores computer-executable instructions for controlling the one or more processors to calculate the first outer parameter matrix based on the at least one first captured image; and calculate the second outer parameter matrix based on the at least one second captured image.

In some embodiments, the memory further stores computer-executable instructions for controlling the one or more processors to determine a mean depth value for a first frame of image by calculating a first mean depth value of one of the first depth image and the second depth image using an image segmentation algorithm; obtain a point cloud space coordinate transformation matrix based on the first depth mean value; and assign the first mean depth value as an initial value of mean depth value for a next frame of image. Optionally, an initial value of mean depth value for the first frame of image is set to be zero.

In some embodiments, the memory further stores computer-executable instructions for controlling the one or more processors to determine a mean depth value for a N-th frame of image, N is an integer $\geq 2$. Optionally, the memory further stores computer-executable instructions for controlling the one or more processors to estimate an estimated N-th depth mean value of one of the first depth image and the second depth image for the N-th frame of image; and compare the estimated N-th depth mean value with an initial value of mean depth value for the N-th frame of image. Optionally, a depth mean value for an (N−1)-th frame of image is assigned as the initial value of mean depth value for the N-th frame of image.

Optionally, the memory further stores computer-executable instructions for controlling the one or more processors to assign a point cloud space coordinate transformation matrix for the (N−1)-th frame of image as a point cloud space coordinate transformation matrix for the N-th frame of image upon a determination that an absolute value of a difference between the estimated N-th depth mean value and the initial value of mean depth value for the N-th frame of image is equal to or less than a threshold value.

Optionally, upon a determination that an absolute value of a difference between the estimated N-th depth mean value and the initial value of mean depth value for the N-th frame of image is greater than a threshold value, the memory further stores computer-executable instructions for controlling the one or more processors to calculate a N-th mean depth value of one of the first depth image and the second depth image for the N-th frame of image using the image segmentation algorithm; obtain a point cloud space coordinate transformation matrix for the N-th frame of image based on the N-th depth mean value; and assign the N-th mean depth value as an initial value of mean depth value for an (N+1)-th frame of image.

In some embodiments, the point cloud space coordinate transformation matrix includes a rotation matrix and a translation matrix. Optionally, the relationship between the first camera coordinate system and the second camera coordinate system is defined by P2=R*P1+T. P2 stands a direction vector of a point in the first three-dimensional point cloud image in the first camera coordinate system; P2 stands a direction vector of a point in the second three-dimensional point cloud image in the second camera coordinate system; R stands for the rotation matrix, and T stands for the translation matrix.

In some embodiments, for stitching the third depth image with the second depth image, the memory further stores computer-executable instructions for controlling the one or more processors to determine a stitching matrix based on image resolutions of the second depth image and the third depth image; fill the stitching matrix with depth values of pixels of the second depth image based on pixel coordinates of the second depth image; traverse depth values of pixels of the third depth image one by one; fill null space of the stitching matrix with the depth values of pixels of the third depth image corresponding to the null space during traversing; and fill non-null space of the stitching matrix with assigned values during traversing. Optionally, each individual one of the assigned values is a minimum value between a non-null value and a depth value of a pixel of the third depth image corresponding to a same individual non-null space of the stitching matrix. Optionally, each individual one of the assigned values is a median value between a non-null value and a depth value of a pixel of the third depth image corresponding to a same individual non-null space of the stitching matrix. Optionally, each individual one of the assigned values is an average value between a non-null value and a depth value of a pixel of the third depth image corresponding to a same individual non-null space of the stitching matrix.

Optionally, the memory further stores computer-executable instructions for controlling the one or more processors to filter the stitched image.

In another aspect, the present disclosure provides a computer-program product comprising a non-transitory tangible computer-readable medium having computer-readable instructions thereon. In some embodiments, the computer-readable instructions being executable by a processor to cause the processor to perform an image stitching method described herein. In some embodiments, the computer-readable instructions being executable by a processor to cause the processor to perform acquiring a first depth image of a present frame of image obtained by a first camera; acquiring a second depth image of the present frame of image obtained by a second camera, the second depth image and the first depth image partially overlapping with each other; converting the first depth image in a first camera coordinate system defined by the first camera into a third depth image in a second camera coordinate system defined by the second camera; and stitching the third depth image with the second depth image to obtain a stitched image.

In another aspect, the present disclosure provides a display apparatus having the image stitching apparatus described herein. In some embodiments, the display apparatus includes the image stitching apparatus described herein, a display panel, a first camera configured to obtain the first depth image of the present frame of image; and a second camera configured to obtain the second depth image of the present frame of image. Optionally, the display apparatus further includes a transmitter configured to project a calibration image. Optionally, the transmitter, the first camera, and the second camera are disposed in a peripheral region of the display apparatus. As used herein, the term "display area" refers to an area of a display substrate (e.g., an opposing substrate or an array substrate) in a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels. As used herein the term "peripheral area" refers to an area of a display substrate (e.g., an opposing substrate or an array substrate) in a display panel where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas.

Figure 12:
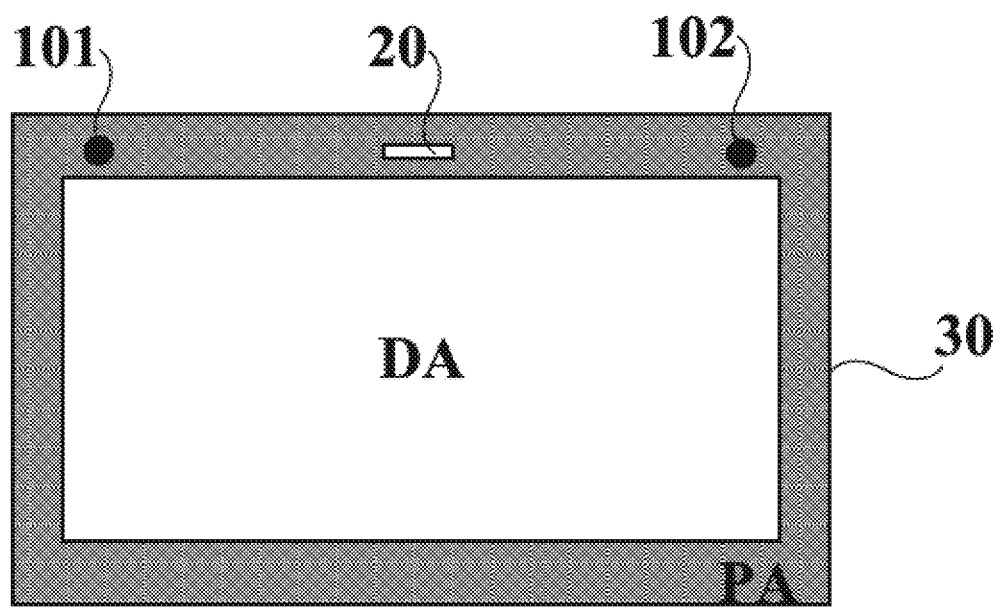
FIG. 12 is a schematic diagram of a display apparatus in some embodiments according to the present disclosure.

FIG. 12 is a schematic diagram of a display apparatus in some embodiments according to the present disclosure. Referring to FIG. 12, the display apparatus in some embodiments includes a display panel 30 having a display area DA and a peripheral area PA. The display apparatus further includes a first camera 101, a second camera 102, and a transmitter 20 in the peripheral area PA.

Figure 13:
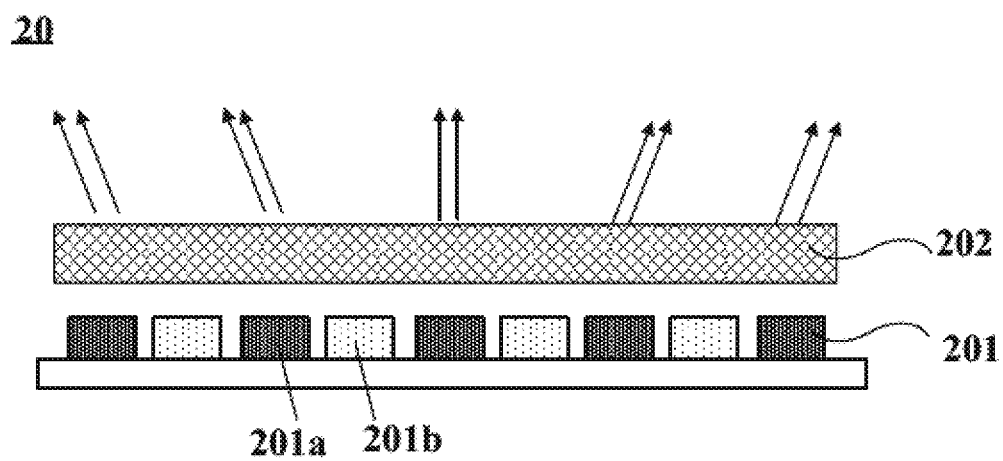
FIG. 13 is a schematic diagram of a transmitter in a display apparatus in some embodiments according to the present disclosure.

FIG. 13 is a schematic diagram of a transmitter in a display apparatus in some embodiments according to the present disclosure. Referring to FIG. 13, the transmitter 20 in some embodiments includes an array of infrared light emitting diodes 201 and a diffusion plate 202 on a light emitting side of the array of infrared light emitting diodes 201. The array of infrared light emitting diodes 201. Infrared light emitting diodes in the array of infrared light emitting diodes 201 may be selectively turned on or turned off, thereby forming a calibration image (e.g., an image having a chessboard pattern as shown in FIG. 6). Referring to FIG. 13, some infrared light emitting diodes 201a are turned off, and other infrared light emitting diodes 201b are turned on.

The diffusion plate 202 is configured to diffuse light emitted from the array of infrared light emitting diodes 201, so that an enlarged image can be formed on a projection plate when the calibration image is projected onto the projection plate. The light diffusion angle of the diffusion plate 202 can be selected based on a material used for making the diffusion plate 202.

Various appropriate light diffusing materials may be used for making the diffusion plate 202. Exemplary methods of preparing light diffusion layer include a matte treatment and a bead treatment. In one example, a layer (e.g., a polymer layer) undergoes a matte treatment to impart a haze on the layer. Optionally, the light diffusion layer has a haze level of at least 20%, e.g., at least 40%, at least 60%, and at least 80%. In another example, the layer (e.g., a polymer layer) undergoes a bead treatment to gain light diffusing function. In some embodiments, the diffusion plate 202 includes a body being substantially transparent and a light diffusing agent dispersed in the body. Optionally, the body includes a polymer material. Optionally, the light diffusing agent includes a plurality of light diffusing particles (e.g., beads). The light diffusing agent may include a polymer. Optionally, the light diffusing agent includes an inorganic material. Optionally, the light diffusing agent is made of one or a combination of silicon oxide, poly ethylene propylene, a silicone resin, an acrylic resin, an epoxy resin, a styrene resin, titanium (IV) oxide ($TiO_2$), zinc oxide (ZnO), barium sulfate ($BASO_4$), calcium sulfate ($CaSO_4$), magnesium carbonate ($MgCO_3$) and aluminum hydroxide ($Al(OH)_3$).

Figure 14:
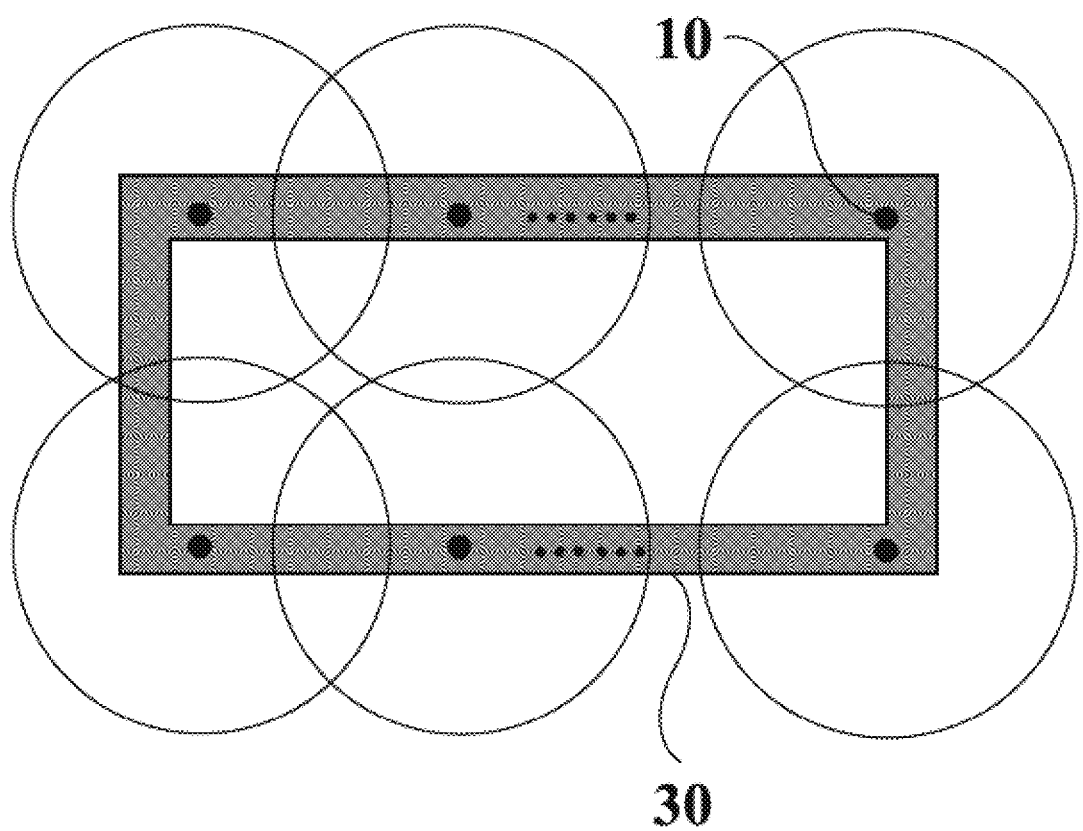
FIG. 14 is a schematic diagram of a display apparatus having a plurality of depth cameras in some embodiments according to the present disclosure.

FIG. 14 is a schematic diagram of a display apparatus having a plurality of depth cameras in some embodiments according to the present disclosure. Referring to FIG. 14, the display apparatus in some embodiments includes a plurality of cameras 10. Adjacent cameras of the plurality of cameras 10 have an overlapping image capturing range. Depth images captured by the adjacent cameras have an overlapping region. The overlapping regions of the depth images need to be stitched.

Various appropriate cameras may be used in the present display apparatus. Examples of appropriate cameras include a structured light camera, a time-of-flight camera, and a binocular camera. Optionally, the camera is a camera capable of detecting infrared light, thereby detecting the infrared light emitted from the transmitter, e.g., the infrared light emitted from an infrared light emitting diode of the transmitter.

Figure 15:
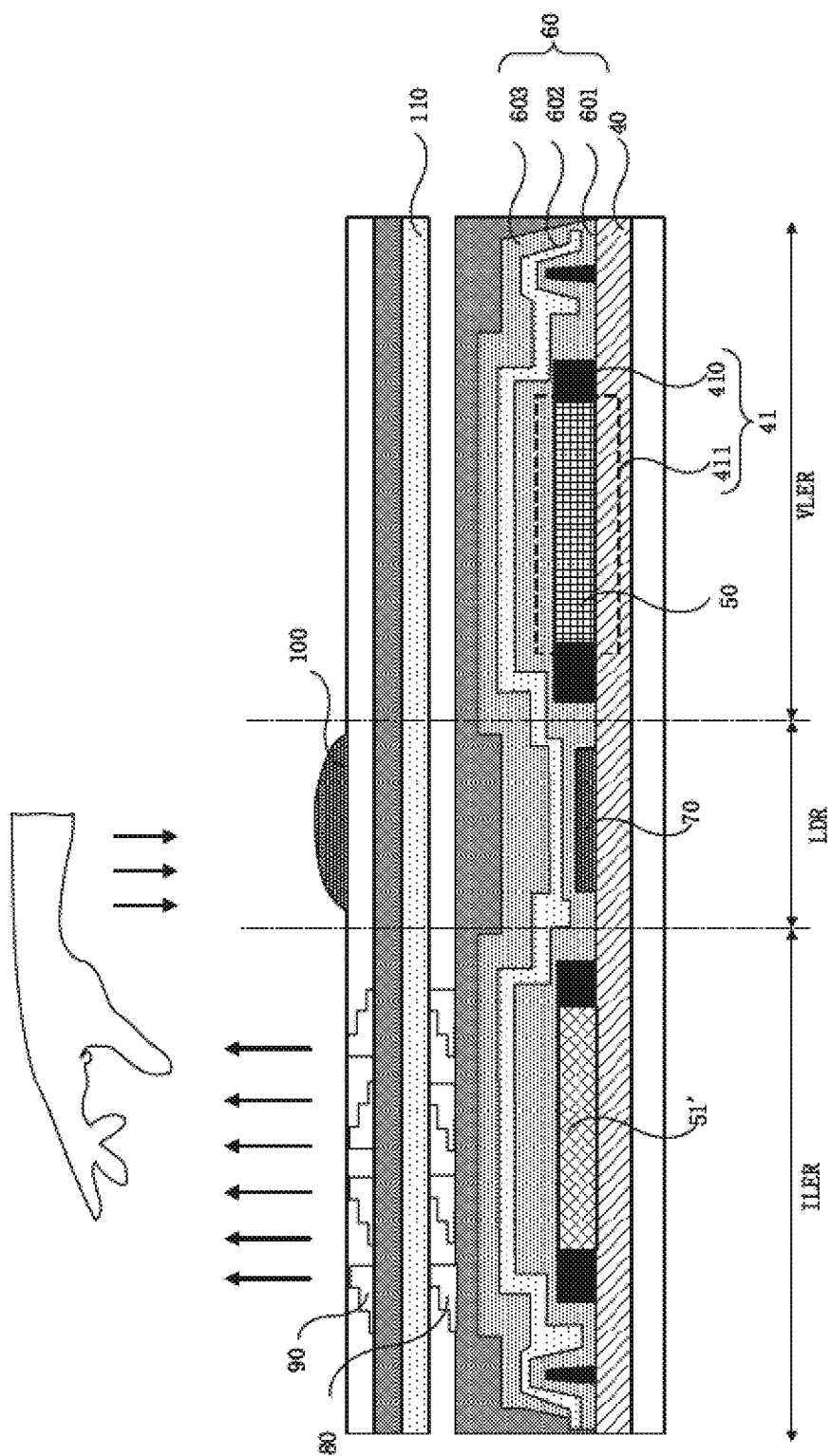
FIG. 15 is a schematic diagram of the internal structure of a display apparatus integrated with a depth camera and a transmitter in some embodiments according to the present disclosure.

In some embodiments, the transmitter is integrated into the display panel. Optionally, the plurality of cameras and the transmitter are integrated into the display panel. FIG. 15 is a schematic diagram of the internal structure of a display apparatus integrated with a depth camera and a transmitter in some embodiments according to the present disclosure. Referring to FIG. 15, the display apparatus in some embodiments includes a thin film transistor array substrate 40, and a pixel definition layer 41 on the thin film transistor array substrate 40. The pixel definition layer 41 defines a plurality of visible light emitting regions VLER configured to display an image of the display apparatus, a plurality of infrared light emitting regions ILER configured to display the calibration image, and a plurality of infrared light detecting regions LDR. In one example, the pixel definition layer 41 includes a retaining wall 410 intersecting horizontally and vertically, and a plurality of recesses 411 surrounded by the retaining wall 410. The plurality of recesses 411 correspond to the plurality of visible light emitting regions VLER, the plurality of infrared light emitting regions ILER, and the plurality of infrared light detecting regions LDR.

In some embodiments, each subpixel of the display apparatus includes one of the plurality of visible light emitting regions VLER for emitting light for image display. Optionally, each subpixel of the display apparatus includes one of the plurality of visible light emitting regions VLER, one of the plurality of infrared light emitting regions ILER for emitting an infrared light to display a calibration image, and one of the plurality of infrared light detecting regions LDR to detect the infrared light.

In some embodiments, the display apparatus is an organic light emitting diode display apparatus. Optionally, the display apparatus includes an organic functional layer 50 in one of the plurality of recesses 411 in one of the plurality of visible light emitting regions VLER. Optionally, the organic functional layer 50 includes a light emitting layer, a hole transport layer, a hole injection layer, an electron transport layer, and an electron injection layer.

In some embodiments, the display apparatus further includes an infrared light emitting layer 51' in one of the plurality of recesses 411 in one of the plurality of infrared light emitting regions ILER. Optionally, the plurality of infrared light emitting regions ILER (and the infrared light emitting layer 51') are disposed in a peripheral area of the display apparatus (e.g., a peripheral area PA as shown in FIG. 12).

In some embodiments, the plurality of camera (including the first camera and the second camera) are integrated into the display panel. Each of the plurality of cameras (e.g., each of the first camera and the second camera) includes a plurality of infrared photodiodes 70 integrated into the display panel. Optionally, the plurality of infrared photodiodes 70 are a plurality of organic infrared photodiodes. Optionally, each of the plurality of infrared photodiodes 70 is disposed in one of the plurality of light detecting regions LDR. Optionally, the plurality of light detecting regions LDR and the plurality of infrared photodiodes 70 are disposed in a peripheral area of the display apparatus (e.g., a peripheral area PA as shown in FIG. 12).

Optionally, the plurality of infrared photodiodes 70, the organic functional layer 50, and the infrared light emitting layer 51' are disposed on the thin film transistor array substrate 40.

In some embodiments, the display apparatus further includes an encapsulating layer 60 encapsulating a plurality of organic light emitting diodes, a plurality of infrared light emitting diodes, and the plurality of infrared photodiodes 70 in the display apparatus. For example, the encapsulating layer 60 encapsulates the organic functional layer 50, the infrared light emitting layer 51', and the plurality of infrared photodiodes 70 in the plurality of recesses 411. Optionally, the encapsulating layer 60 includes a plurality of sub-layers, e.g., 601, 602, and 603. Optionally, the sub-layers 601 and 603 are inorganic encapsulating sub-layers and the sub-layer 602 is an organic encapsulating sub-layer. Optionally, the sub-layers 601 and 603 are organic encapsulating sub-layers and the sub-layer 602 is an inorganic encapsulating sub-layer.

In some embodiments, the display apparatus further includes an optical film on a side of the encapsulating layer facing away the plurality of organic light emitting diodes, the plurality of infrared light emitting diodes, and the plurality of infrared photodiodes 70. Optionally, the optical film includes the diffusion plate discussed above. Optionally, the optical film includes an optical alignment device 80. Optionally, the optical film further includes a diffractive optical element 90 (DOE). Optionally, the display apparatus further includes one or more insulating layers 110 spacing apart various optical film elements such as the optical alignment device 80 and the diffractive optical element 90.

The plurality of infrared photodiodes 70 may be disposed in any appropriate position in the display apparatus. Optionally, the plurality of infrared photodiodes 70 are on a side of the pixel definition layer facing away the thin film transistor array substrate 40. Optionally, the plurality of infrared photodiodes 70 are on a side of the pixel definition layer facing the thin film transistor array substrate 40.

In some embodiments, the display apparatus further includes a lens film 100. Optionally, the lens film 100 is on a side of the encapsulating layer 60 facing away one of the plurality of infrared photodiodes 70.

Optionally, the display apparatus is a liquid crystal display apparatus. Optionally, the display apparatus is an organic light emitting diode display apparatus. Optionally, the display apparatus is an electrophoretic display apparatus. Examples of touch display apparatuses include, but are not limited to, an electronic paper, a mobile phone, a tablet computer, a television, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image stitching method, comprising:
    acquiring a first depth image of a present frame of image obtained by a first camera;
    acquiring a second depth image of the present frame of image obtained by a second camera, the second depth image and the first depth image partially overlapping with each other;
    converting the first depth image in a first camera coordinate system defined by the first camera into a third depth image in a second camera coordinate system defined by the second camera; and
    stitching the third depth image with the second depth image to obtain a stitched image;
    wherein converting the first depth image in the first camera coordinate system defined by the first camera into the third depth image in the second camera coordinate system defined by the second camera comprises:
    determining a mean depth value of one of the first depth image and the second depth image;
    determining a point cloud space coordinate transformation matrix based on the mean depth value;
    projecting the first depth image into a first camera coordinate system defined by the first camera to form a first three-dimensional point cloud image in the first camera coordinate system;
    projecting the first three-dimensional point cloud image into a second camera coordinate system defined by the second camera to form a second three-dimensional point cloud image, based on a point cloud space coordinate transformation matrix and a relationship between the first camera coordinate system and the second camera coordinate system; and
    transforming the second three-dimensional point cloud image into the third depth image in the second camera coordinate system.

2. The image stitching method of claim 1, prior to acquiring the first depth image and the second depth image, further comprising:
    calibrating the first camera to obtain a first outer parameter matrix of the first camera;
    calibrating the second camera to obtain a second outer parameter matrix of the second camera; and
    obtaining the point cloud space coordinate transformation matrix and the relationship between the first camera coordinate system and the second camera coordinate system, based on the first outer parameter matrix and the second outer parameter matrix.

3. The image stitching method of claim 2, wherein calibrating the first camera comprise:
    projecting a calibration image onto a projection plane;
    capturing at least one first captured image using the first camera at at least one image-capturing angle and at least one image-capturing distance from the projection plane; and
    calculating the first outer parameter matrix based on the at least one first captured image;
    wherein calibrating the second camera comprise:
    projecting the calibration image onto a projection plane;
    capturing at least one second captured image using the second camera at at least one image-capturing angle and at least one image-capturing distance from the projection plane; and
    calculating the second outer parameter matrix based on the at least one second captured image.

4. The image stitching method of claim 1, wherein determining the mean depth value comprises determining a mean depth value for a first frame of image;
    wherein determining the mean depth value for the first frame of image comprises:
    calculating a first mean depth value of one of the first depth image and the second depth image using an image segmentation algorithm;
    obtaining a point cloud space coordinate transformation matrix based on the first depth mean value; and
    assigning the first mean depth value as an initial value of mean depth value for a next frame of image;
    wherein an initial value of mean depth value for the first frame of image is set to be zero.

5. The image stitching method of claim 4, wherein determining the mean depth value comprises determining a mean depth value for a N-th frame of image, N is an integer ≥2;
    wherein determining the mean depth value for the N-th frame of image comprises:
    estimating an estimated N-th depth mean value of one of the first depth image and the second depth image for the N-th frame of image; and
    comparing the estimated N-th depth mean value with an initial value of mean depth value for the N-th frame of image;
    wherein a depth mean value for an (N−1)-th frame of image is assigned as the initial value of mean depth value for the N-th frame of image.

6. The image stitching method of claim 5, further comprising assigning a point cloud space coordinate transformation matrix for the (N−1)-th frame of image as a point cloud space coordinate transformation matrix for the N-th frame of image upon a determination that an absolute value of a difference between the estimated N-th depth mean value and the initial value of mean depth value for the N-th frame of image is equal to or less than a threshold value.

7. The image stitching method of claim 5, upon a determination that an absolute value of a difference between the estimated N-th depth mean value and the initial value of mean depth value for the N-th frame of image is greater than a threshold value, further comprising:
    calculating a N-th mean depth value of one of the first depth image and the second depth image for the N-th frame of image using the image segmentation algorithm;
    obtaining a point cloud space coordinate transformation matrix for the N-th frame of image based on the N-th depth mean value; and assigning the N-th mean depth value as an initial value of mean depth value for an (N+1)-th frame of image.

8. The image stitching method of claim 1, wherein the point cloud space coordinate transformation matrix comprises a rotation matrix and a translation matrix; and
the relationship between the first camera coordinate system and the second camera coordinate system is defined by P2=R*P1+T;
wherein P2 stands a direction vector of a point in the first three-dimensional point cloud image in the first camera coordinate system; P2 stands a direction vector of a point in the second three-dimensional point cloud image in the second camera coordinate system; R stands for the rotation matrix, and T stands for the translation matrix.

9. The image stitching method of claim 1, wherein stitching the third depth image with the second depth image comprises:
determining a stitching matrix based on image resolutions of the second depth image and the third depth image;
filling the stitching matrix with depth values of pixels of the second depth image based on pixel coordinates of the second depth image;
traversing depth values of pixels of the third depth image one by one;
filling null space of the stitching matrix with the depth values of pixels of the third depth image corresponding to the null space during traversing;
filling non-null space of the stitching matrix with assigned values during traversing;
wherein each individual one of the assigned values is selected from a group consisting of a minimum value between a non-null value and a depth value of a pixel of the third depth image corresponding to a same individual non-null space of the stitching matrix, a median value between a non-null value and a depth value of a pixel of the third depth image corresponding to a same individual non-null space of the stitching matrix, and an average value between a non-null value and a depth value of a pixel of the third depth image corresponding to a same individual non-null space of the stitching matrix.

10. The image stitching method of claim 9, subsequent to stitching the third depth image with the second depth image, further comprising filtering the stitched image.

11. An image stitching apparatus, comprising:
a memory; and
one or more processors;
wherein the memory and the one or more processors are connected with each other; and
the memory stores computer-executable instructions for controlling the one or more processors to:
acquire a first depth image of a present frame of image obtained by a first camera;
acquire a second depth image of the present frame of image obtained by a second camera, the second depth image and the first depth image partially overlapping with each other;
convert the first depth image in a first camera coordinate system defined by the first camera into a third depth image in a second camera coordinate system defined by the second camera; and
stitch the third depth image with a second depth image to obtain a stitched image
wherein, to covert the first depth image in the first camera coordinate system defined by the first camera into the third depth image in the second camera coordinate system defined by the second camera, the memory further stores computer-executable instructions for controlling the one or more processors to:
determining a mean depth value of one of the first depth image and the second depth image;
determining a point cloud space coordinate transformation matrix based on the mean depth value;
projecting the first depth image into a first camera coordinate system defined by the first camera to form a first three-dimensional point cloud image in the first camera coordinate system;
projecting the first three-dimensional point cloud image into a second camera coordinate system defined by the second camera to form a second three-dimensional point cloud image, based on a point cloud space coordinate transformation matrix and a relationship between the first camera coordinate system and the second camera coordinate system; and
transforming the second three-dimensional point cloud image into the third depth image in the second camera coordinate system.

12. A display apparatus, comprising the image stitching apparatus of claim 11;
a display panel;
a first camera configured to obtain the first depth image of the present frame of image; and
a second camera configured to obtain the second depth image of the present frame of image.

13. The display apparatus of claim 12, further comprising a transmitter configured to project a calibration image.

14. The display apparatus of claim 13, wherein the transmitter comprises an array of infrared light emitting diodes and a diffusion plate on a light emitting side of the array of infrared light emitting diodes.

15. The display apparatus of claim 14, wherein the display panel comprises a pixel definition layer defining the plurality of visible light emitting regions and the plurality of infrared light emitting regions;
the transmitter comprises an array of a plurality of infrared light emitting diodes respectively in the plurality of infrared light emitting regions; and
the display panel comprises a plurality of organic light emitting diodes respectively in the plurality of visible light emitting regions.

16. The display apparatus of claim 13, wherein the transmitter is integrated into the display panel; and
the display panel has a plurality of infrared light emitting regions configured to display the calibration image and a plurality of visible light emitting regions configured to display an image of the display apparatus.

17. The display apparatus of claim 12, wherein the first camera and the second camera are integrated into the display panel; and
each of the first camera and the second camera includes a plurality of infrared photodiodes integrated into the display panel.

18. The display apparatus of claim 17, further comprising a transmitter configured to project a calibration image;
wherein the display panel comprises a pixel definition layer defining a plurality of visible light emitting regions, the plurality of infrared light emitting regions, and a plurality of infrared light detecting regions;
the display panel comprises a plurality of organic light emitting diodes respectively in the plurality of visible light emitting regions;

the transmitter comprises an array of a plurality of infrared light emitting diodes respectively in the plurality of infrared light emitting regions; and the plurality of infrared photodiodes are respectively in the plurality of infrared light detecting regions.

19. A computer-program product comprising a non-transitory tangible computer-readable medium having computer-readable instructions thereon, the computer-readable instructions being executable by a processor to cause the processor to perform:

acquiring a first depth image of a present frame of image obtained by a first camera;

acquiring a second depth image of the present frame of image obtained by a second camera, the second depth image and the first depth image partially overlapping with each other;

converting the first depth image in a first camera coordinate system defined by the first camera into a third depth image in a second camera coordinate system defined by the second camera; and stitching the third depth image with the second depth image to obtain a stitched image;

wherein converting the first depth image in the first camera coordinate system defined by the first camera into the third depth image in the second camera coordinate system defined by the second camera comprises:

determining a mean depth value of one of the first depth image and the second depth image;

determining a point cloud space coordinate transformation matrix based on the mean depth value;

projecting the first depth image into a first camera coordinate system defined by the first camera to form a first three-dimensional point cloud image in the first camera coordinate system;

projecting the first three-dimensional point cloud image into a second camera coordinate system defined by the second camera to form a second three-dimensional point cloud image, based on a point cloud space coordinate transformation matrix and a relationship between the first camera coordinate system and the second camera coordinate system; and transforming the second three-dimensional point cloud image into the third depth image in the second camera coordinate system.

* * * * *